United States Patent [19]
Machida

[11] Patent Number: 5,875,323
[45] Date of Patent: Feb. 23, 1999

[54] PROCESSOR USING IMPLICIT REGISTER ADDRESSING

[75] Inventor: Hirohisa Machida, Itami, Japan

[73] Assignee: Mitsubishi Denki Kabushiki Kaisha, Tokyo, Japan

[21] Appl. No.: 547,798

[22] Filed: Oct. 25, 1995

[30] Foreign Application Priority Data

Dec. 13, 1994 [JP] Japan .................................. 6-309198

[51] Int. Cl.[6] .................................................. G06F 9/302
[52] U.S. Cl. ........................................ 395/562; 395/564
[58] Field of Search .................................... 395/562, 568, 395/567, 800, 571, 570, 500, 378, 386, 388, 564, 565, 566, 561, 800.23, 384; 364/247, 247.8

[56] References Cited

U.S. PATENT DOCUMENTS

| | | | |
|---|---|---|---|
| 4,334,269 | 6/1982 | Shibasaki et al. | 395/378 |
| 5,142,633 | 8/1992 | Murray et al. | 395/566 |
| 5,680,568 | 10/1997 | Sakamura | 395/386 |

OTHER PUBLICATIONS

Philip Koopman Jr, Stack Computers: the new wave, Ellis Harword Limted, Chapter 3, pp. 32–48, Jun. 1989.
Ken Sakamura (Ed.), TRON Project 1987, Open Architecture Computer Systems, Chapter 5, pp. 199–225, Dec. 1987.
Koopman, Jr., Stack Computers: the new wave, 1989, pp. 69–77.
Intell, LAPX 86/88, 186/188 User's Manual, Hardware Reference, 1985, pp. 1–3, 1–7, 1–15, 1–35.
Fontaine, A.B. et al., *80286 and 80386 Microprocessors*, Macmillan Education 1989. The examiner's attention is directed to pp. 172, 173, 174, and 181.
Mips Risc Architecture, pp. 2–1, Gerry Kane, "R2000 Processor Overview", date unknown.
IEEE Transactions On Computers, vol. 41, No. 11, pp. 1484–1488, Nov. 1992, Jordi Cortadella, et al., "Evaluation of A +B=K Conditions Without Carry Propagation".

*Primary Examiner*—Richard L. Ellis
*Assistant Examiner*—Patrice L. Winder
*Attorney, Agent, or Firm*—Oblon, Spivak, McClelland, Maier & Neustadt, P.C.

[57] ABSTRACT

To obtain a high performance computer decreased in the number of commands to be executed. A control circuit receives a command (CMD), and outputs a special command signal which becomes "H" when the command (CMD) instructs "push" command, to a register file. The register file, when the special command signal is "H", outputs the stored data value of register as register data regardless of the values of read register address signals, and and outputs the stored data value of register as register data. An ALU adds the register data and control data, and outputs the ALU operation result to the register file. An address adder adds the register data and control data, and outputs the address addition result to an external memory.

16 Claims, 19 Drawing Sheets

*FIG. 1*

```
COMMAND 1: jal A                COMMAND 1: 000011_00000_00000_00000_00000_001010
COMMAND 2: addi $2, $0, 1       COMMAND 2: 001000_00010_00000_00000_00000_000001
COMMAND 3:                      COMMAND 3:

A:                              A:
COMMAND 10: push -1, -6         COMMAND 10: 111111_11111_11111_11111_11111_111010
COMMAND 11: addi $4, $3, 3      COMMAND 11: 001000_00100_00011_00000_00000_000011
COMMAND 12: jal B               COMMAND 12: 000011_00000_00000_00001_00000_000000
COMMAND 13: lw $31, 5($29)      COMMAND 13: 100011_11101_11111_11111_00000_000101
COMMAND 14: addi $29, 6         COMMAND 14: 001000_11101_11101_00000_00000_000110
COMMAND 15: jr $31              COMMAND 15: 000000_11111_00000_00000_00000_001000
```

FIG. 4

```
COMMAND 1 : addi $30,$0,1024                    COMMAND 1 : 001000_11110_00000_0000010000000000
COMMAND 2 : addi $28,$0,1                       COMMAND 2 : 001000_11100_00000_0000000000000001
COMMAND 3 :                                     COMMAND 3 :
COMMAND 4 : addibne $28,$30,1,COMMAND ADDRESS   COMMAND 4 : 111110_11100_11110_00000000000001_1111111111111111
```

FIG. 5

```
COMMAND 1 : addi    $30, $0, 1024
COMMAND 2 : addi    $28, $0, 1
COMMAND 3 :
COMMAND 4 : addibne 1, ADDRESS OF COMMAND 3

COMMAND 1 : 001000_11110_00000_0000010000000000
COMMAND 2 : 001000_11100_00000_0000000000000001
COMMAND 3 :
COMMAND 4 : 111110_00000_00001_1111111111111111
```

FIG. 8

```
COMMAND 1: addi  $1, $0, 1024
COMMAND 2: addi  $2, $0, 1
COMMAND 3: addi  $3, $0, 1025
COMMAND 4: addi  $4, $0, 1
COMMAND 5:
COMMAND 6: addi  $4, $4, 1
COMMAND 7: bne   $4, $3, ADDRESS OF COMMAND 5
COMMAND 8:
COMMAND 9: addi  $2, $2, 1
COMMAND 10: bne  $2, $1, ADDRESS OF COMMAND 3
COMMAND 11:
```

```
COMMAND 1 : 001000_00001_00000_0000010000000000
COMMAND 2 : 001000_00010_00000_0000000000000001
COMMAND 3 : 001000_00011_00000_0000010000000001
COMMAND 4 : 001000_00100_00000_0000000000000001
COMMAND 5 :
COMMAND 6 : 001000_00100_00100_0000000000000001
COMMAND 7 : 000101_00100_00011_1111111111111110
COMMAND 8 :
COMMAND 9 : 001000_00010_00010_0000000000000001
COMMAND 10: 000101_00010_0001_1111111111111001
COMMAND 11:
```

FIG. 9

```
COMMAND 1: addi      $28, $0, 1024
COMMAND 2: addi      $24, $0, 1
COMMAND 3: addi      $29, $0, 1025
COMMAND 4: addi      $25, $0, 1
COMMAND 5:
COMMAND 6: addibne   %0, 1, ADDRESS OF COMMAND 5
COMMADN 7:
COMMAND 8: addibne   %5, 1, ADDRESS OF COMMAND 3
COMMAND 9:
```

```
COMMAND 1: 001000_11100_00000_0000010000000000
COMMAND 2: 001000_11000_00000_0000000000000001
COMMAND 3: 001000_11101_00000_0000010000000001
COMMAND 4: 001000_11001_00000_0000000000000001
COMMAND 5:
COMMAND 6: 111110_00000_00001_1111111111111111
COMMAND 7:
COMMAND 8: 111110_00101_00001_1111111111111101
COMMAND 9:
```

FIG. 17

COMMAND 1: jal A
COMMAND 2: addi $2, $0, 1
COMMAND 3:

A:
COMMAND 10: addi $29, -6
COMMAND 11: sw $31, 5($29)
COMMAND 12: addi $4, $3, 3
COMMAND 13: jal B
COMMAND 14: lw $31, 5($29)
COMMAND 15: addi $29, 6
COMMAND 16: jr $31

COMMAND 1: 000011_00000_00000_0000000000001010
COMMAND 2: 001000_00010_00000_0000000000000001
COMMAND 3:

A:
COMMAND 10: 001000_11101_11101_1111111111111010
COMMAND 11: 101011_11101_11111_0000000000000101
COMMAND 12: 001000_00100_00011_0000000000000011
COMMAND 13: 000011_00000_00000_0000100000000000
COMMAND 14: 100011_11101_11111_0000000000000101
COMMAND 15: 001000_11101_11101_0000000000000110
COMMAND 16: 000000_11111_00000_0000000000001000

FIG. 18

COMMAND 1: addi $30, $0, 1024
COMMAND 2: addi $28, $0, 1
COMMAND 3:
COMMAND 4: addi $28, $28, 1
         (addi $28, $28, 1)
COMMAND 5: bne $28, $30, ADDRESS OF COMMAND 3

COMMNAD 1: 001000_11110_00000_0000010000000000
COMMAND 2: 001000_11100_00000_0000000000000001
COMMAND 3:
COMMAND 4: 001000_11100_11100_0000000000000001
COMMAND 5: 000101_11100_11110_1111111111111110

PROCESSOR USING IMPLICIT REGISTER ADDRESSING

BACKGROUND OF THE INVENTION

1. Field of the Invention

The present invention relates to a high performance computer using a reduced number of commands to be executed.

2. Description of the Background Art

A computer realizes various processes by converting an arbitrary procedure programmed in software into a series of commands described in the command language executed by the computer, and executing this series of commands. The MIPS R3000 computer (hereinafter called R3000) developed by MIPS is a known computer. The R3000 is specifically described in "mips RISC ARCHITECTURE" by Gerry Kane.

FIG. 14 is a block diagram showing the structure of a central processing unit (CPU) of the R3000. In the diagram, reference numeral 1 is a register file, 2 is an arithmetic and logic unit (ALU), 3 is an address adder, 4 is a program counter, and 5 is a control circuit (including a command decoder). Shift circuits, multiplying circuits and all others relating to operation are included in the ALU 2.

Reference numerals 6a and 6b are stored data of registers readout from the register file 1, 7a and 7b are immediate values outputted from a control circuit, 8 is an operation result of the ALU, 9 is output data of a program counter or an address value of a command memory, CMD is an output signal of a command memory or a command for operating this computer, and 11 is an operation result of an address adder or an address value of a data memory. Reference numeral 18 is address data showing the number of a write register described in a command word, and 16a and 16b are address data showing the numbers of read registers described in each command word.

The control circuit 5 receives a command CMD, and outputs control data 7a and 7b to the ALU 2 and address adder 3 according to the command CMD, and also outputs read register address signals 16a and 16b and a write register address signal 18 to the register file 1.

The register file 1 outputs the register data 6a to the ALU 2 and address adder 3 according to the read register address signals 16a and 16b and the write register address signal 18, and also outputs the register data 6b to an external memory (not shown). If a write register is instructed by the write register address 18, the ALU operation result 8 is written into the write register.

The ALU 2 adds the register data 6a and control data 7a, and outputs the result of the addition or the ALU operation result 8 to the register file 1.

The address adder 3 adds the register data 6a and control data 7b, and outputs the result of the addition or the address addition result 11 to the external memory. This address addition result 11 is the address to be accessed by the external memory.

The program counter 4 sequentially increases and outputs the program count value 9 when the control signal 23 is "L".

The computer R3000 interprets the command 10 having read the program count value 9 as an address value in the control circuit 5, generates a necessary signal, and gives the signal to the corresponding blocks to execute the processing.

FIG. 15 is an explanatory diagram showing an internal constitution structure of the register file 1. As shown in the diagram, memory cells MC are formed in a matrix, and memory cells MC of each line are registers R0 to R31 of $0 to $31. Access to these memory cells MC is effected under control of decoding circuits 600 to 602.

The decoding circuit 600 receives a write register address signal 18, and selectively asserts plural write register selection lines 19 according to the write register address signal 18. The decoding circuit 601 receives the read register address signal 16a, and selectively asserts plural read register selection lines 20a according to the read register address signal 16a. The decoding circuit 602 receives a read register address signal 16b, and selectively asserts a read register selection line 20b according to the read register address signal 16b.

FIG. 16 is a circuit diagram showing an internal structure of a memory cell MC. As shown in the diagram, a memory unit 21 includes a loop connection of inverters G1 and G2, and an NMOS transistor Q1 is inserted between the input unit of the inverter G1 and a write signal line L8 in which one-bit information of ALU operation result 8 is obtained. The output of the inverter G1 is connected to the input of an inverter G3, and an NMOS transistor Q2 is inserted between the output unit of the inverter G3 and a register data line L6a in which one-bit information of register data 6a is outputted. The output of the inverter G1 is also connected to the input of an inverter G4, and an NMOS transistor Q3 is inserted between the output unit of the inverter G4 and a register data line L6b in which one-bit information of register data 6b is outputted. To the gate of the transistor Q1, a write selection line L1 is connected, and a read selection line L2a is connected to the gate of the transistor Q2, and a read selection line L2b is connected to the gate of the transistor Q3. To the write selection line L1, the write register selection line 19 is connected, and the read register selection line 20a is connected to the read selection line L2a, and the read register selection line 20b is connected to the read selection line L2b.

Therefore, when the write register selection line 19 becomes H, the transistor Q1 is turned on, and the one-bit information of the ALU operation result 8 obtained from the write signal line L8 is written into the memory unit 21; when the read register selection line 20a becomes H, the transistor Q2 is turned on, and the stored data in the memory unit 21 is outputted as register data 6a through the data register line L6a; and when the read register selection line 20b becomes H, the transistor Q3 is turned on, and the stored data of the memory unit 21 is outputted as register data 6b through the register data line L6b.

In this register file 1, the write register selection line 19 is selectively asserted based on the write register address signal 18, and the ALU operation result 8 is written into the memory cell MC of register Ri (i=0 to 31) connected to the write register selection line 19 when asserted; the read register selection line 20a is when asserted the read register address signal 16a, and register data 6a is outputted from the memory cell MC of register Ri connected to the read register selection line 20a when asserted; and the read register selection line 20b is asserted based on the read register address signal 16b, and register data 6b is outputted from the memory cell MC of register Ri connected to the read register selection line 20b when asserted.

In this way, the register file 1 includes a data memory device group in a bit width that can be processed by a processor existing inside the computer. In the case of the register file 1 of the R3000, there are 32 registers of 32-bit width, and they are numbered from $0 to $31 to be distinguished. In the specification, hereinbelow, the x-th register in a group of 32 registers is expressed as $x.

In a recent computer, these register groups can freely read and write data, but in the case of the R3000, in particular, the register $0 is specified as a zero register, in which data cannot be written and, when reading, always the value 0 is read out, as determined in the hardware.

Incidentally, $31 is called a link register, which is specified as a register in which the data of the return destination address is stored when restoring after execution of a branch command. Besides, $29 is specified as a register for stack pointer, and this is a register for storing the address value on an external memory element for saving the data in the register in advance, in case of change of the value of the register in the CPU before the command at the branch destination is branched in the case of execution of the branch command.

However, $31 and $29 are determined in the manner of use only by type, and can be used for storing other data, and no problem is caused if used otherwise. Accordingly, for the use of $29, it is necessary to specify its number in the command word. As for $31, basically, it is necessary to specify its number in the command word, but it can be also used without specifying in the command word.

Unlike the R3000, there are other computers in which the registers can be used for specific commands only. In such computers, the read and write registers are determined by the commands, the name of registers is not particularly described in the command word.

In a recent computer, software called a compiler is essential, and the existing computers of high speed and high performance are realized by the hardware of a computer and the software of a compiler. The compiler is a kind of software which shuffles the commands in an order easy to execute by the computer, or makes efficient use of the operation units of the computer. For the compiler, the efficiency is high when the computer incorporates many registers so that the data can be moved among registers of the computer. Therefore, instead of limiting the registers by commands, it is convenient if various registers can be utilized by various commands. In most recent high performance computers, hence, registers are not fixed by commands.

In a computer having registers fixed by commands, the degree of complexity increases, and only up to eight registers can be installed, and in computers having 16 or more registers (32 in most recent ones), registers are not fixed by commands. Accordingly, the number (or name) of the register to be used is specified in the command word. Designation of register by command is more advantageous for a semiconductor integrated circuit because the register file can be composed of memory elements or the like.

The address adder is an adder for calculating the address of an external memory element when executing a load command (a command of reading data of an external memory element of CPU into a register in the CPU) or store command (a command of writing data of a register in the CPU into an external memory element of CPU). Besides, the ALU, program counter, and control circuit are ordinary circuits necessary in a computer, and are not particularly explained herein.

Described below are examples of execution of various commands by the R3000 representing the conventional computers. FIG. 17 shows command word and machine language of a command for executing a call-return statement (a command of branching into arbitrary series of commands and returning to an original series of commands) by the R3000. A machine language is an expression of a command word in a series of binary numerals so as to be understood by the computer, and in a recent high performance computer, one command has a fixed length of 32 bits.

In FIG. 17, command 1 is calling a series of commands A (composed of command 10 to command 16) by using the command "jal". When processing of the series of commands A is over, returning to command 2, then command 2 is executed. Such processing is called call-return process. In command 1, the address value of command 10, or 10 in this case, is set in the program counter. In the machine language of command 1, the first six bits express the branch command "jal", and the subsequent five bits and next five bits and final 16 bits express the branch destination address 10. This "10" is set in the program counter 4.

In the "jal" command, it is necessary to return to the next command after completion of the execution of the series of commands A at the branch destination, and the address value of command 2, that is, 2 is set in the register $31 tacitly in the hardware. In the command word or machine language, nothing is required to be specified. In the "jal" command, it is tacitly known that the value adding 1 to the present program count value (1 showing the address of command 1) (that is, 2 showing the address of command 2) is written in $31, so that it is not necessary to describe particularly in machine language. It corresponds to the special case of using the register $31 without specifying it after the command.

The computer executes command 10 after command 1. Command 10, "addi", is an addition command, and it shows that the stored data of register $29 is added with (−6) and written into register $29. In the machine language of command 10, the first six bits express the command of "addi", the subsequent five bits represent register $29 to write in, next five bit, register $29 to read out, and final 16 bits, addition data (−6). In the ordinary "addi" command, the read register and write register are different, and two registers must be specified, and in this case, too, the register $29 must be specified twice in the machine language.

Command 11 is a store command, which means the stored data of register $31 is stored in an address of an external memory of the CPU, and the address herein is the summed value of the stored data of register $29 and 5. That is, the command 13 to be executed later is "jal" command same as command 1, and the address of return destination is unconditionally written in the register $31, and therefore this command occurs because it is necessary to save the stored data of the present register $31 in the external memory. In the machine language of command 11, the first six bits express the store command, the next five bits denote the register number $29 necessary for address calculation, the subsequent five bits represent the register number $31 hold the data to be stored outside, and the final 16 bits refer to data 5 to be added.

In this way, in the computer, in order to save the data of a register to an external memory, a register for specifying the address of a vacant space on the memory to save in is required, and it corresponds to register $29 in the R3000. In this example, only the stored data of register $31 is saved, but the number of registers to be saved is arbitrary depending on the number of registers to be used by the series of commands.

It may be considered that command 12 and command 13 are intrinsic commands of the series of commands A, while command 10 and command 11 are preparations for executing command 12 and command 13. Command 13 is "jal"

command, and after executing the necessary processing after branching, it returns to command 14. Command 14 is a load command, and the value adding 5 to the stored data of register $29 is used as the address number for reading the data from the external memory, and is transferred and written into the register $31. That is, so the series of commands A may return to the called command, the return destination address is set in the register $31. Command 15 means that the stored data of register $29 and 5 are summed up. It means to return to the stored data of register $29 before calling the series of commands, that is, to return the vacant space to the initial state.

Command 16 instructs that the address value indicated by register $31 is set to the program counter, and branched. In this example, the stored data value of the register $31 is 2, that is, the address value of command 2, and control branches to command 2. That is, control returns to the next command after command 1 which called the series of commands A.

Below is specifically described the processing method of command 10 and command 11 in FIG. 17 by the conventional computer shown in FIG. 14.

1) When processing the "addi" command of command 10 in FIG. 17

The control circuit 5 decodes the command CMD, sets "11101" as write address signal 18, and "11101" as the read register address signal 16a, and sets the immediate value −6 to be added as control data 7a. The register file 1 outputs the stored data (D29) of register $29 as the register data 6a, on the basis of the read register address signal 16a and write register address signal 18, and specifies the register $29 as write register. Consequently, the ALU 2 outputs the ALU operation result 8 obtained by adding the register data 6a (D29) and control data 7a ("−6") to the register file 1, so that the ALU operation result 8 is written in as the stored data value of register $29 in the register file 1.

2) When processing "sw" command of command 11 in FIG. 17

The control circuit 5 decodes the command CMD, sets "11101" as the read register address signal 16a, and "11111" as the other read register address signal 16b, and sets the immediate value 5 to be added as control data 7b. The register file 1, on the basis of the read register addresses 16a and 16b, the stored data value (D29) of register $29 is added to the address adder 3 as register data 6a, and the stored data value (D31) of register $31 is outputted to the external memory as register data 6b.

The address adder 3 outputs the address addition result 11 obtained by adding the register data 6a (D29) and control data 7b ("5") to the external memory. As a result, the value stored in register $31 is written in the external memory having an address equal to the address addition result 11.

FIG. 18 is a diagram showing the command for executing the "for" statement by the R3000 (the command repeatedly executing the same command row a specified number of times), together with the command code and its machine language. FIG. 18 shows an example of "for" statement of repeating the command instructed by command 3 by 1024 times.

First, command 1 sets 1024 as the number of repetitions in the first register. In command 1, "addi" is an addition command, and it shows that 1024 is added to the stored data value of register $0 to be written in $30. In register $0, the value is always 0 as mentioned above. In the machine language of command 1, the first six bits represent the addition command "addi", the next five bits denote register $30, the next five bits denote $0, and the final 16 bits express 1024.

In command 2, similarly, as the stored data of register $28, "1" is set as the meaning of the first of repetition. Command 3 is an intrinsic command (processing) to be repeatedly executed by the "for" statement, and there is only one command 3 in this example, but about 64,000 (216) commands are possible.

In command 4, after executing necessary processing (command 3 herein), the value 1 is added to the stored data value of register $28, and it is set as the stored data value of register $28. The read register and write register are same, and therefore the command may be described as shown in parentheses. In the machine language, however, since it is the same command as ordinary "addi" command, the first six bits represent the addition command "addi", the next five bits represent the read register $28 the next five bits express the write register $28, and the final 16 bits express addition 1. Thus, in the machine language, $28 must be described twice.

In command 5, the stored data value of register $28 and stored value of register $30 are compared, and if not coinciding, it means, to return to the process two addresses back of the presently running address (that is, address of command 3). In the machine language of command 5, same as the machine language of command 1, the first six bits express the comparison branch command [bne], the next five bits, the stored data value of register $28, the next five bits, the stored data value of register $30, and final 16 bits, −2.

In command 5, until the stored data value of register $28 becomes 1024, the stored value of register $28 and stored value data $30 do not coincide. In command 4, the stored data value of register $28 increase by one each, and therefore the stored data value of register $28 does not reach 1024 unless command 4 is executed 1024 times from command 3. When the stored data value of register $28 becomes 1024, in command 5, the stored data value of register $28 and stored data value of register $30 coincide, so that the processing is transferred to command 6 without branching to command 3. Hence, repeated command of "for" statement is executed.

FIG. 19 is a block diagram showing a specific structure of the R3000 shown in FIG. 14. As shown in the diagram, the R3000 is provided with a comparator 100 for branch command control. The comparator 100 receives register data 6a and register data 6b, and outputs the comparison result of the register data 6a and register data 6b to the program counter 4 as a comparative result signal 101.

The control circuit 5 usually outputs a control signal 23 of "L", and when the command CMD instructs "bne" command, the control signal 23 of "H" is outputted to the program counter 4.

The program counter 4 receives the control signal 23, control data 7b, and comparative result signal 101, and outputs the value adding the control data 7b to the present program count value 9 as a new program count value 9 when the control signal 23 is "H" and the comparative result signal 101 indicates disagreement, and adds 1 to the program count value 9 and outputs as a new program count value 9 when the control signal is "H" and the comparative result signal 101 indicates agreement. The program counter 4 sequentially increases the program count value 9 and outputs when the control signal 23 is "L".

The processing method of command 4 and command 5 in FIG. 18 by the R3000 shown in FIG. 19 is described below.

1) When processing "addi" command of command 4 in FIG. 18

The control circuit 5 decodes the command CMD, and sets "11100" as the write address signal and "11100" as the read register address signal 16a, and sets the immediate value 1 to be added as the control data 7a. The register file 1 outputs the stored data value (D28) of register $28 as the register data 6a, on the basis of the read register address signal 16a and write register address signal 18, and specifies register 28 as the write register. Consequently, the ALU 2 outputs the ALU operation result 8 obtained by summing up the register data 6a (D28) and control data 7a (1), and therefore the ALU operation result 8 is written as the stored data value of the register $28 in the register file 1.

2) When processing "bne" command of command 5 in FIG. 18

The control circuit 5 decodes the command CMD, and sets "11100" as the read register address signal 16a, and "11110" as the other read register address signal 16b, and sets the immediate value −2 added to the program count value 9 as control data 7b. The control circuit 5 outputs the control signal 23. The register file 1 outputs the stored data value (D28) of register $28 as the register data 6a on the basis of the read register address signals 16a and 16b, and outputs stored data value (D30) of register $30 as register data 6b. The comparator 100 compares the register data 6a (D28) and register data 6b (D30), and outputs the result of comparison to the program counter 4 as comparative result signal 101.

As a result, the program counter 4 which receives the control signal 23 of "H" outputs the value ("3") adding control data 7b ("−2") to the present program count value 9 ("5") as a new program count value 9 when the comparison result signal 101 indicates disagreement, and adds 1 to the present program count value 9 ("5") and outputs as a new program count value 9 ("6") when the comparative result signal 101 shows agreement.

In this way, in the conventional computer such as the R3000, when performing call-return process, as shown in FIG. 17, the called series of commands 10 was always requested to execute command 10 and command 11. Similarly, in the case of loop processing, as shown in FIG. 18, it was required to execute the loop control commands, that is, command 4 and command 5.

That is, every time the call-return process or loop command is executed, always two commands must be executed regardless of the content of the command to be executed, and it was inefficient.

SUMMARY OF THE INVENTION

A first aspect of the invention relates to a computer comprising a data read section having plural registers for receiving a command obtained from outside, and outputting stored data of the plural registers selectively as read data on the basis of the command, the command containing a special command not specifying any register for reading out stored data, and a data operation section for operating according to the read data to output the result of operation, wherein the data read section specifies predetermined two registers out of the plural registers as first and second specific registers when the command is the special command, and outputs first stored data which is stored data of the first specific register and second stored data which is stored data of the second specific register as the read data.

A second aspect of the invention relates to a computer, wherein the data read section comprising control means for outputting a read address signal on the basis of the command, and outputting a special command signal in active state when the command is the special command, and a register group having the plural registers, for receiving the read address signal, and outputting stored data of the plural registers selectively as the read data on the basis of the read address signal, wherein the register group further receives the special command signal, and outputs the first and second stored data of the first and second special register as the read data regardless of the read address signal when the special command is in active state.

A third aspect of the invention relates to a computer, wherein the special command is specified of the type of command, first number, and second number, the data read section further outputs the first number and second number as the read data when the command is the special command, the data operation section comprising first operation means for operating according to the first stored data and the first number to output a first operation result, and second operation means for operating according to the second stored data and the second number to output a second operation result.

A fourth aspect of the invention relates to a computer, wherein the data read section writes the first operation result into the first specific register when the command is the special command, and the second operation result is specified as a write address of an external memory, and the second stored data is specified as write data into the write address of the external memory.

A fifth aspect of the invention relates to a computer comprising a data read section having plural registers for outputting stored data of the plural registers selectively as read data on the basis of a command obtained from outside, and a data operation unit for operating according to the read data and outputting an operation result, wherein the data read section specifies one predetermined register out of the plural registers as a reference register when the command is a special command, and outputs reference stored data which is stored data in the reference register as the read data, and wherein the data operation section comprises data comparative means for comparing the reference stored data with comparative data to output a comparative result signal.

A sixth aspect of the invention relates to a computer, wherein the data read section comprising control means for outputting a read address signal on the basis of the command, and outputting a special command signal in active state when the command is a special command, and a register group having the plural registers, for receiving the read address signal, and outputting stored data of the plural registers selectively as the read data on the basis of the read address signal, wherein the register group further receives the special command signal, and outputs the reference stored data of the reference register as the read data regardless of the read address signal when the special command is in active state.

A seventh aspect of the invention relates to a computer, wherein the data read section further outputs a control signal which becomes in active state only when the command is the special command, further comprising a program counter for receiving the control signal and the comparative result signal, and outputting a program count value for specifying the address of a command presently being subject to execution, on the basis of the comparative result signal, when the control signal is in active state.

An eighth aspect of the invention relates to a computer, wherein the special command is a command not specifying any address for reading out stored data, the data read section specifies one predetermined register other than the reference register as an addition register, out of the plural registers, when the command is the special command, and further outputs addition stored data which is stored data in the addition register as the read data, and the comparative data is data on the basis of the addition stored data.

A ninth aspect of the invention relates to a computer, wherein the data read section comprising control means for outputting a read address signal on the basis of the command, and outputting a special command signal in active state when the command is a special command, and a register group having the plural registers, for receiving the read address signal, and outputting stored data of the plural registers selectively as the read data on the basis of the read address signal, wherein the register group further receives the special command signal, and outputs the reference stored data of the reference register and the addition stored data of the addition register as the read data regardless of the read address signal when the special command is in active state.

A tenth aspect of the invention relates to a computer, wherein the special command is a command describing a register specifying item for specifying an addition register out of the plural registers, the data read section specifies the addition register out of the plural registers, on the basis of the register specifying item, when the command is the special command, and further outputs addition stored data which is stored data in the addition register, and the comparative data is data on the basis of the addition stored data.

An eleventh aspect of the invention relates to a computer comprising a data read section having plural registers for outputting stored data of the plural registers selectively as read data on the basis of a command obtained from outside, wherein the data read section preliminarily specifies two or more registers out of the plural registers as an addition register group, and preliminarily specifies two or more registers out of the plural registers other than the addition register group as a reference register group, the command includes a special command describing a first register specifying item for specifying an addition register in the addition register group, and a second register specifying item for specifying a reference register in the reference register group, a data operation section to operate according to the read data, and outputting an operation result, wherein the data read section specifies the addition register in the addition register group on the basis of the first register specifying item, when the command is the special command, specifies the reference register in the reference register group on the basis of the second register specifying item, and outputs as the read data both addition stored data which is stored data of the addition register and reference stored data which is stored data of the reference register, and the data operation section comprises data comparative means for comparing comparative data on the basis of the addition data with the reference stored data to output a comparative result signal.

A twelfth aspect of the invention relates to a computer, wherein the special command is a command further specifying a predetermined number for additions, the data read section further outputs the predetermined number for additions as the read data when the command is the special command, and the comparative data is obtained by adding the predetermined number for additions to the addition stored data.

A thirteenth aspect of the invention relates to a computer, wherein the data operation section further comprises operation means for adding the addition stored data and the predetermined number for additions, and outputting an operation result, and the data read section writes the operation result into the addition register when the command is the special command.

A fourteenth aspect of the invention relates to a computer, wherein the data read section comprises control means for outputting a read address signal on the basis of the command, and also outputting the control signal in active state when the command is the special command, a first register group having the plural registers, for receiving the read address signal, and outputting stored data of the plural registers selectively as the read data, on the basis of the read address signal, a second register group having a copy reference register for storing same data as the reference stored data in the reference register in the plural registers, and a copy addition register for storing same data as the addition stored data of the addition register in the plural registers, for outputting stored data of the copy reference register as the reference stored data, and stored data of the copy addition register as the addition stored data at all times, and a program counter for receiving the control signal and the comparative result signal, and outputting a program count value for specifying an address of a command presently subject to execution, on the basis of the comparative result signal, when the control signal in active state.

A fifteenth aspect of the invention relates to a computer, wherein the special command is a command further defined in a predetermined number for additions, the control means further outputs the predetermined number for additions when the command is the special command, and the comparative data is data obtained by adding the predetermined number for additions to the addition stored data.

A sixteenth aspect of the invention relates to a computer, wherein the data operation section further comprises operation means for adding the addition stored data and the predetermined number for additions to output an operation result, and the control means writes the operation result into the addition register and the copy addition register, by outputting a write address signal for indicating to write the operation result into the addition register and the copy addition register to the first and second register groups, when the command is the special command.

According to the computer of the first aspect of the invention, the data read section specifies two preliminarily determined registers out of the plural registers as first and second specific registers in the case of the special command not specifying the register for reading out the stored data, and reads out and outputs the first stored data which is the stored data of the first specific register and second stored data which is the stored data of the second specific register.

Therefore, the special command can describe another instruction, instead of explicitly specifying the first and second specific registers.

The computer of the second aspect comprises the control means for asserting a special command signal when the command is the special command, and the register group for outputting the first and second stored data of the first and second specific registers as read data regardless of the read address signal when the special command signal is in active state.

Therefore, when the command is the special command, the first and second stored data are promptly outputted from the register group, so that the special command can be executed at higher speed.

According to the computer of the third aspect, the data operation section comprises the first operation means for operating according to the first stored data and a first number to output the first operation result, and a second operation means for operating according to the second stored data and a second number to output the second operation result, so that the two operations can be processed simultaneously.

Moreover, according to the computer of the fourth aspect, the data read section writes the first operation result in the first specific register when the command is a special command, the second operation result is specified as write address of external memory, and the second stored data is specified as write data into the write address on the external memory, so that the writing processing into the first specific register and writing processing into the external memory can be done simultaneously.

According to the computer of the fifth aspect of the invention, the data read section specifies one preliminarily determined register out of plural registers as reference register when the command is a special command, and the reference stored data which is the stored data of the reference register is outputted as read data.

Therefore, the special command can describe other instruction, instead of description for specifying reference register.

The computer of the sixth aspect comprises the control means for outputting a special command signal in active state when the command is a special command, and the register group for outputting the reference stored data of the reference register as read data regardless of the read address when the special command signal is in active state.

Therefore, when the command is a special command, the reference stored data is promptly outputted from the register group, so that the special command can be executed at higher speed.

According to the computer of the seventh aspect, the data read section further comprises a program counter which further outputs a control signal becoming in active state only when the command is a special command, and outputs a program count value for specifying the address of the command presently subject to execution, on the basis of the comparative result signal, when the control signal is in active state.

Therefore, by the special command, the processing for changing the program count value can be executed.

According to the computer of the eighth aspect, the data read section specifies one predetermined register other than the reference register from the plural registers as the addition register when the command is a special command, and further outputs the addition stored data which is the stored data of the addition register as read data.

Therefore, the specific special data can describe other instruction, instead of describing to specify the reference register and addition register.

The computer of the ninth aspect comprises the control means for outputting a special command signal in active state when the command is a special command, and the register group for outputting the reference stored data of the reference register and the addition stored data of the addition register as the read data regardless of the read address signal when the special command signal is in active state.

Therefore, when the command is a special command, the reference stored data and addition stored data are outputted from the register group promptly, so that the special command can be executed at higher speed.

According to the computer of the tenth aspect, the data read section specifies the specific data out of the plural registers on the basis of the register specifying item described in the special command when the command is the special command, and further outputs the addition stored data which is the stored data of the addition register, so that the addition register can be selected out of the plural registers, thereby expanding the selection range of the addition register.

According to the computer of the eleventh aspect of the invention, the data read section specifies the addition register in the addition register group on the basis of the first register specifying item when the command is a special command, specifies a reference register in the reference register group on the basis of the second register specifying item, and outputs the addition stored data which is the stored data of the addition register and the reference stored data which is the stored data of the reference register as the read data.

Therefore, the special command can describe other instruction, instead of minimizing the description for specifying the addition register and reference register.

In addition, the addition register can be selected from the addition register group, and the reference register can be selected from the reference register group, so that the selection range of the addition and reference registers can be expanded.

According to the computer of the twelfth aspect, by using the data obtained by adding a predetermined number for addition to the addition stored data as the comparative data, the comparative result signal can be used as the branching judgement.

According to the computer of the thirteenth aspect, the data operation unit further comprises the operation means for adding the addition stored data and predetermined number for addition to output the operation result in the same value as the comparative data, and the data read section writes the operation results into the addition register when the command is a special command, so that the comparative result signal can be used as the signal for judgement of end of loop processing, using the addition stored data as control parameter.

According to the computer of the fourteenth aspect, the data read section comprises a copy reference register for storing the same data as the reference stored data of the reference register in the plural registers, a copy addition register for storing the same data as the addition stored data of the addition register in the plural registers, and a second register group for always outputting the stored data of the copy reference data as the reference stored data, and the stored data of the copy addition data as the addition stored data, and hence the data comparative means can output the comparative result signal at high speed on the basis of the reference stored data and addition stored data obtained from the second register group.

In addition, it further comprises a program counter which outputs the program count value for specifying the address presently subject to execution on the basis of the comparative result signal when the control signal is in active state, so that the program count value can be changed by the special command.

According to the computer of the fifteenth aspect, by using the data obtained by adding a predetermined number for addition to the addition stored data as the comparative data, the comparative result signal can be used as the branch judgement.

According to the computer of the sixteenth aspect, the data operation section further comprises operation means for adding the addition stored data and a predetermined number for addition to output the operation result in the same value as the comparative data, and the control means writes the operation result into the addition register and copy addition register by outputting the write address signal for instructing to write the operation result into the addition register and copy addition register into the first and second register groups when the command is the special command, and therefore the comparative result signal can be used as the signal for judging the end of loop processing using the addition stored parameter obtained from the copy addition register as the control parameter.

It is therefore an object of the present invention to provide a computer of high performance decreased in the number of commands to be executed in order to solve the problems in the prior art.

These and other objects, features, aspects and advantages of the present invention will become more apparent from the following description of the present invention when taken in conjunction with the accompanying drawings.

BRIEF DESCRIPTION OF THE DRAWINGS

FIG. 1 is an explanatory diagram showing a command row used in a first preferred embodiment of the invention.

FIG. 4 is an explanatory diagram showing a series of command including combination commands of two commands.

FIG. 5 is an explanatory diagram showing a series of commands used in a second preferred embodiment of the invention.

FIG. 8 is an explanatory diagram showing a series of commands including double loop commands.

FIG. 9 is an explanatory diagram showing a series of commands used in the second preferred embodiment of the invention.

FIG. 17 is an explanatory diagram showing a conventional series of commands.

FIG. 18 is an explanatory diagram showing a conventional series of commands.

DESCRIPTION OF THE PREFERRED EMBODIMENTS

<<First Preferred Embodiment>>

<Principle>

Figure 2:
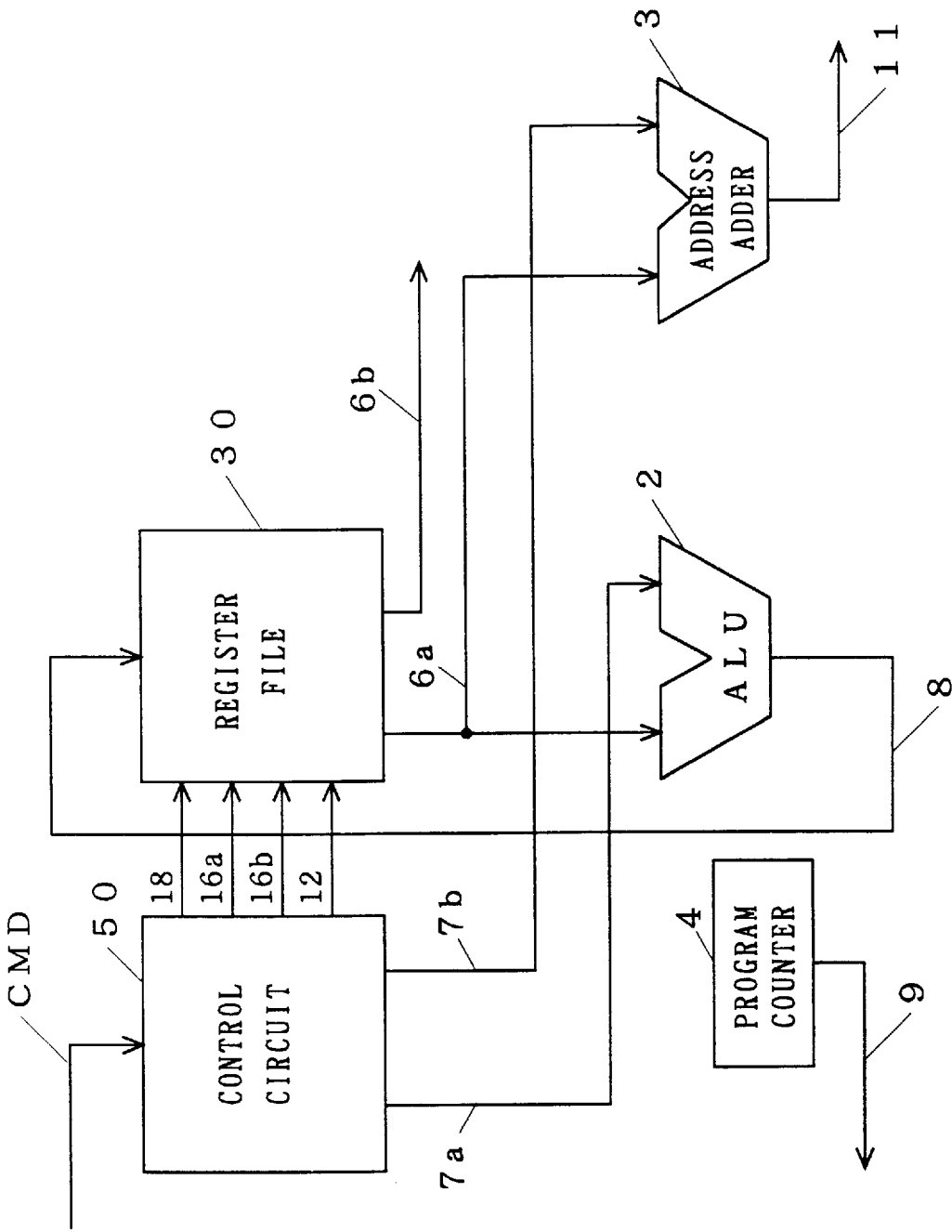
FIG. 2 is a block diagram showing the constitution of a computer in the first preferred embodiment of the invention.

In executing the series of commands shown in FIG. 17, in the R3000, the addition command of command 10 is executed by the ALU 2, and the addition by the store command of command 11 is executed by the address adder 3. Thus, when calling a command row, it is almost indispensable to execute both processing of the stack pointer register \$29 and processing of return destination address register (link register) \$31, and the register numbers are determined tacitly. In the command row A, moreover, the command 10 subtracts 6 from the stored data value of the register \$29, and the command 11 adds 5 to the stored data value of the register \$29 as a result of command 10 to determine the address value, thereby executing the store command, and therefore, in short, the value 1 is subtracted from the stored data value of the register \$29 before execution of the command 10 may be used as the address value for executing the store command.

The present invention provides a new command capable of executing both command 10 and command 11 simultaneously. Suppose the command to be a "push" command, then the command in FIG. 17 becomes a series of commands as shown in FIG. 1. In command 10 it is tacitly known that the stored data values of registers \$29 and \$31 are operated on, although not particularly specified in the command word. Command 10 means that −6 is added to the stored data value of register \$29 and the result is written into register \$29, and at the same time the stored data value of register \$31 is written into the external memory of the address value adding −1 to the stored data value of register \$29. The machine language of command 10 is set as in FIG. 1. The first six bits express a "push" command, the subsequent five bits and next five bits (10 bits in total) represent −1, and the final 16 bits denote −6.

By composing the series of commands as in FIG. 1, the series of commands A that initially required execution of six commands can be executed by five commands only. For example, if there is a program that is executed by calling this command row many times, it is expected that the performance may be enhanced by the number of times of calling. Moreover, since the two commands were originally calculated in different adders, by adding the "push" command, the hardware structure is not complicated.

In the "push" command, when calculating an external address, the stored data value of register \$29 and the value of 10 bits are added or subtracted. In the initial series of commands, the value of 16 bits is added or subtracted with the stored data value of register \$29, and further the value of 16 bits is added or subtracted. Therefore, in the addition of 10 bits in "push" command, the number of bits is shorter than the initial command, and it is possible that the same function as the original command cannot be executed. For example:

Prior art: address value=\$29 | x (26 bits) | y (16 bits)

Embodiment: address value=\$29 | z (10 bits)

However, the value of z is the difference of x and y, and it is highly possible that it may be a very small value among numbers that can be expressed by 16 bits, and from the characteristic of the stack pointer, it is mostly smaller than 32 (number of registers). Therefore, if the value to be added is 10, no problem exists. Yet, in the case of a series of commands which may cause a problem by the use of the new "push" command, it is possible to execute with the conventional series of commands (since the conventional computer function is not changed at all), and hence the reduction of the number of bits ultimately causes no problem. The addition of 10 bits only is a sufficient number of bits in the widely used call-return statement considering from the characteristic of the program.

15

<Structure>

A hardware structure of the computer in the first preferred embodiment of the invention for processing the command in FIG. 1 is shown in FIG. 2. In FIG. 2, reference numeral 1 is a register file, 2 is an arithmetic and logic unit (ALU), 3 is an address adder, 4 is a program counter, and 5 is a control circuit (including command decoder). Herein, shift circuits, multiplying circuits and all others relating to operation are supposed to be contained in the ALU 2. Reference numerals 6a and 6b are register (stored) data being read out from a register file 30, 7a and 7b are control data being outputted from the control circuit, 8 is an operation result of ALU, 9 is a program count value outputted from the program counter 4, that is, the address value of command memory, CMD is an output signal of command memory, that is, a command for operating the computer, and 11 is an operation result of address adder, that is, an address value of data memory. Reference numeral 18 is a register address signal in which the number of the register to write in described in the command word is written, and 16a and 16b are register address signals showing the number of the register to read described in the command word. Reference numeral 12 is a special command signal meaning "push" command, and it is asserted when the command CMD instructs a "push" command.

The control circuit 50 receives the command CMD, outputs control data 7a and 7b to the ALU 2 and address adder 3 respectively according to the command CMD, and further outputs the special command signal 12, read register address signals 16a, 16b, and write register address signal 18 to the register file 30.

The register file 30 outputs the register data 6a into the ALU 2 and address adder 3 according to the special command signal 12, read register address signals 16 a and 16b and write register address signal 18, and further outputs the register data 6b to an external memory not shown. If the write register is instructed by the write register address signal 18, the ALU operation result 8 is written in the write register.

Moreover, when the special command signal 12 is asserted, the register file 30 outputs the stored data value of register $29 as register data 6a regardless of the read register address signals 16a and 16b, and also outputs the stored data value of register $31 as register data 6b.

The ALU 2 adds the register data 6a and control data 7a, and outputs the result of addition, that is, the ALU operation result 8 to the register file 30.

In the address adder 3, adding the register data 6a and control data 7b, outputs the result of addition, that is, the address addition result 11 to the external memory. This address addition result 11 is the address to be accessed by the external memory.

The program counter 4 sequentially outputs the program count value 9.

In FIG. 2, functions necessary for processing of ordinary computer and connections of blocks are omitted. Of course, the computer of the invention can execute the processing of an ordinary computer.

<Register File>

Figure 3:
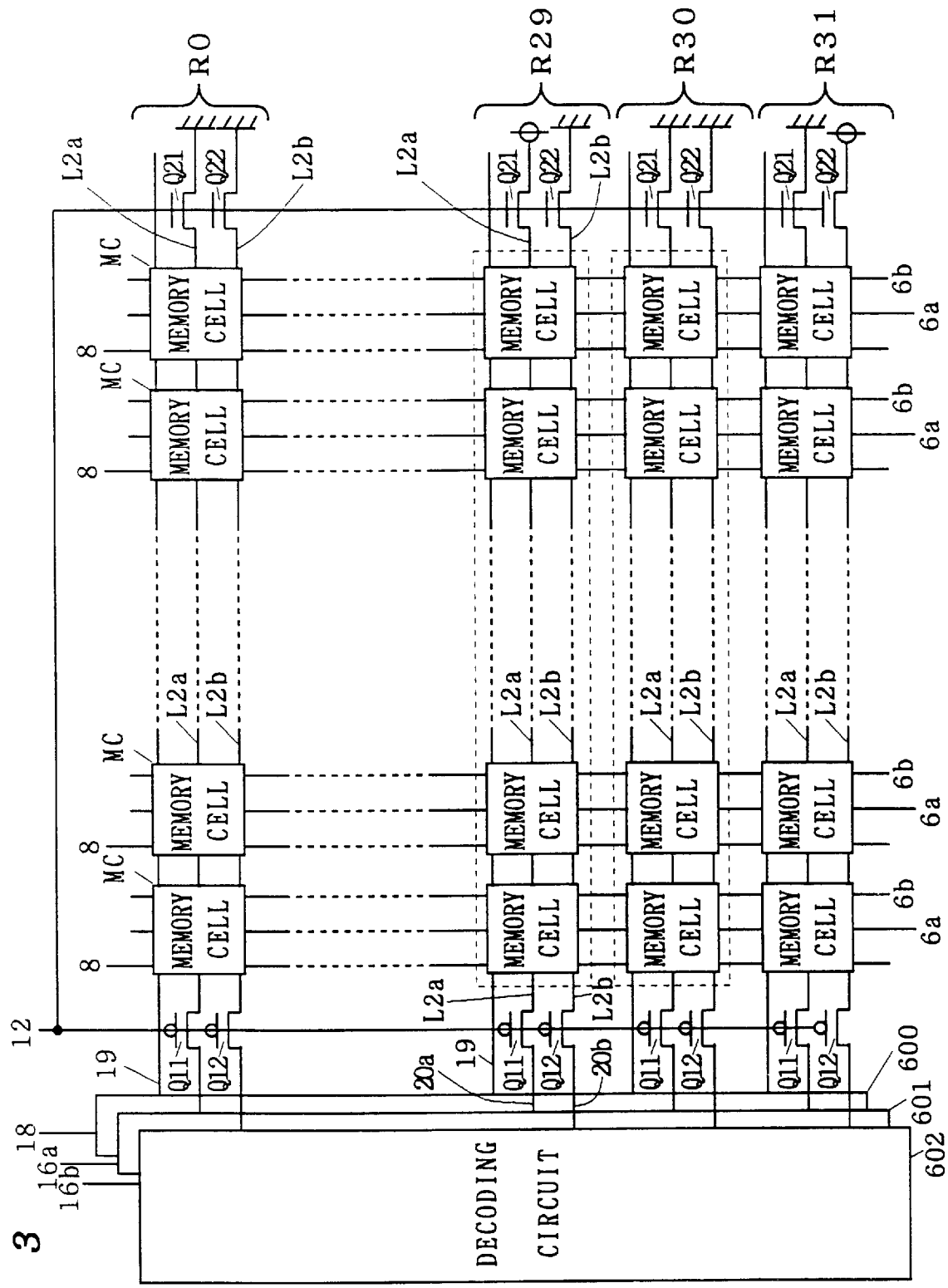
FIG. 3 is an explanatory diagram showing an internal structure of a register file in FIG. 2.

FIG. 3 is an explanatory diagram showing an internal structure of the register file 30 of the first preferred embodiment. As shown in the diagram, memory cells MC are composed in a matrix, and memory cells MC of each line are registers R0 to R31 of $0 to $31. Access to these memory cells MC is effected under the control of decoding circuits 600 to 602.

16

The decoding circuit 600 receives a write register address signal 18, and selectively sets "H" the plural writer register address selection lines 19 on the basis of the write register address signal 18. The decoding circuit 601 receives the read register address signal 16a, and selectively sets "H" the plural read register selection lines 20a on the basis of the read register address signal 16a. The decoding circuit 602 receives the read register address signal 16b, and selectively sets "H" the read register selection line 20b on the basis of the read register address signal 16b.

Between each read register selection line 20a of the decoding circuit 601 and the read selection line L2a of each one of registers R0 to R31, a PMOS transistor Q11 is individually inserted, and between each read register selection line 20b and the read selection line L2b of each one of registers R0 to R31, a PMOS transistor Q12 is individually inserted. A special command signal 12 is commonly connected to the gates of the transistors Q11 and Q12.

Moreover, each read selection line L2a of registers R0 to R28, R30, and R31 is grounded through an NMOS transistor Q21, and only the read selection line L2a of register R29 is connected to a power source VDD through the NMOS transistor Q21. Each read selection line L2b of registers R0 to R30 is connected through an NMOS transistor Q22, and only the read selection line L2b of register R31 is connected to the power source VDD through the NMOS transistor Q22. The special command signal 12 is commonly connected to the gates of the transistors Q21 and 22.

Therefore, when the special command signal 12 is H, the transistors Q11 and Q12 are turned off, and the transistors Q21 and Q22 are turned on, and hence all read selection lines L2a and read selection lines L2b are released from the control of the decoding circuits 601 and 602, and are set to H or L by force. That is, each read selection line L2a of registers R0 to R28, R30 and R31 is set to L, the read selection line L2a of register R29 is set to H, each read selection line L2b of registers R0 to R30 is set to L, and the read selection line L2b of register R31 is set to H.

Figure 15:
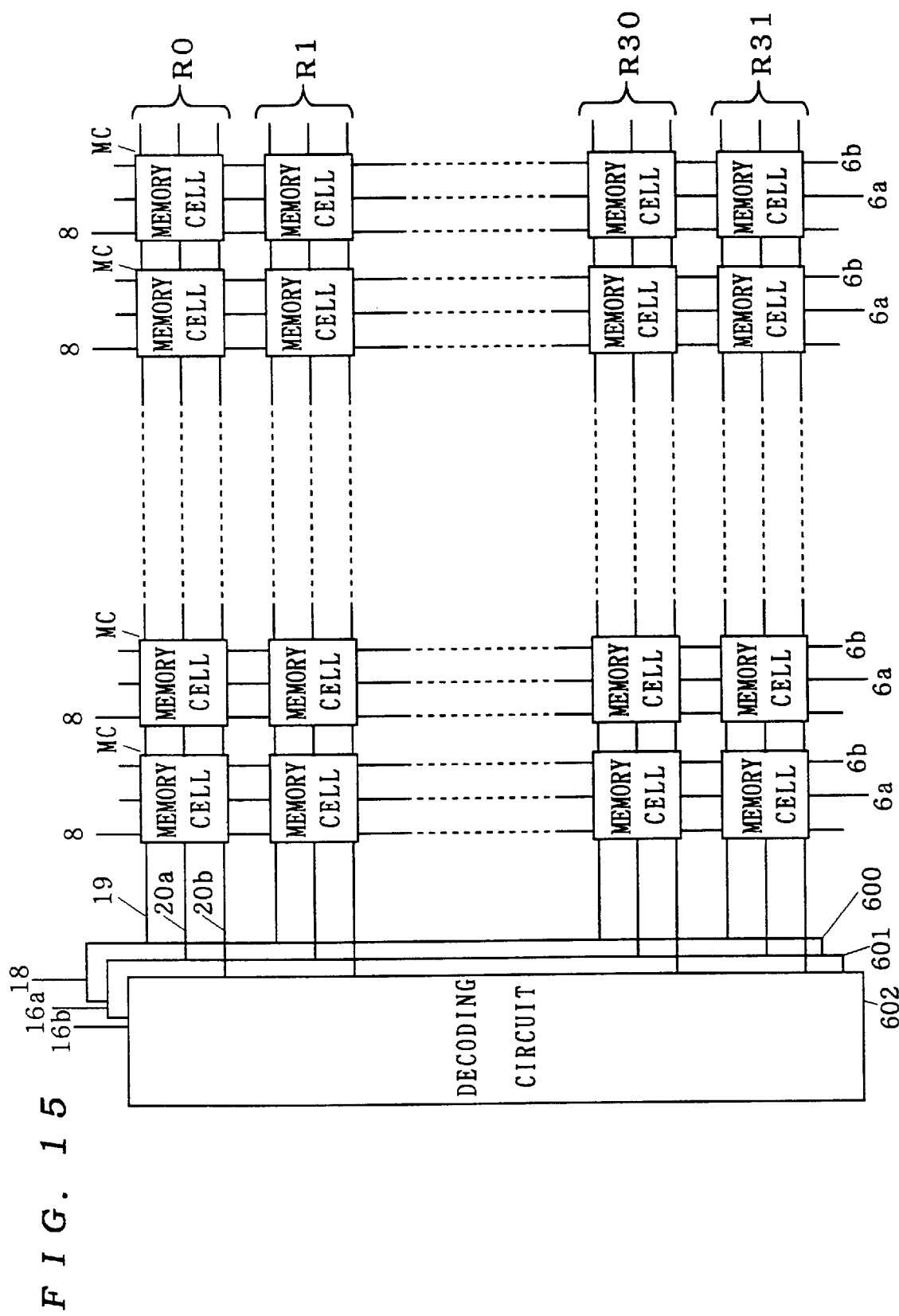
FIG. 15 is an explanatory diagram showing an internal structure of a register file in FIG. 14.
Figure 16:
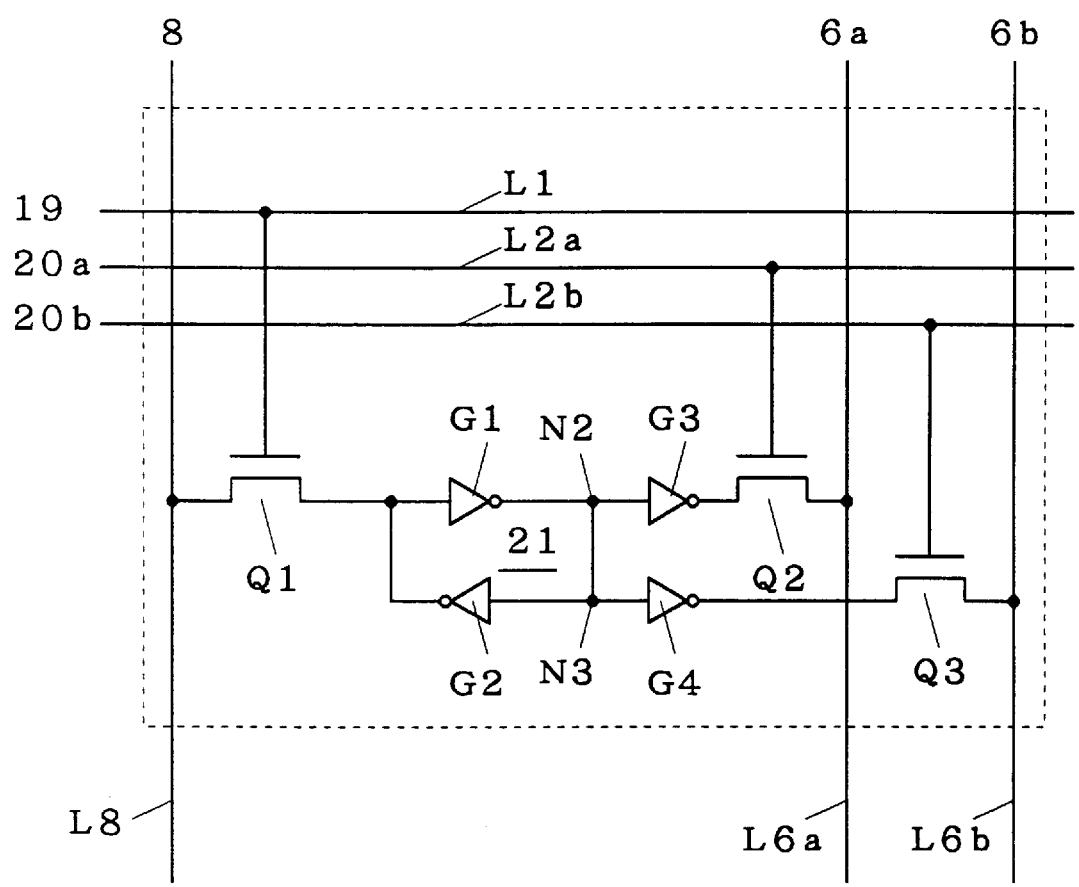
FIG. 16 is a circuit diagram showing an internal structure of a memory cell in FIG. 15.
Figure 19:
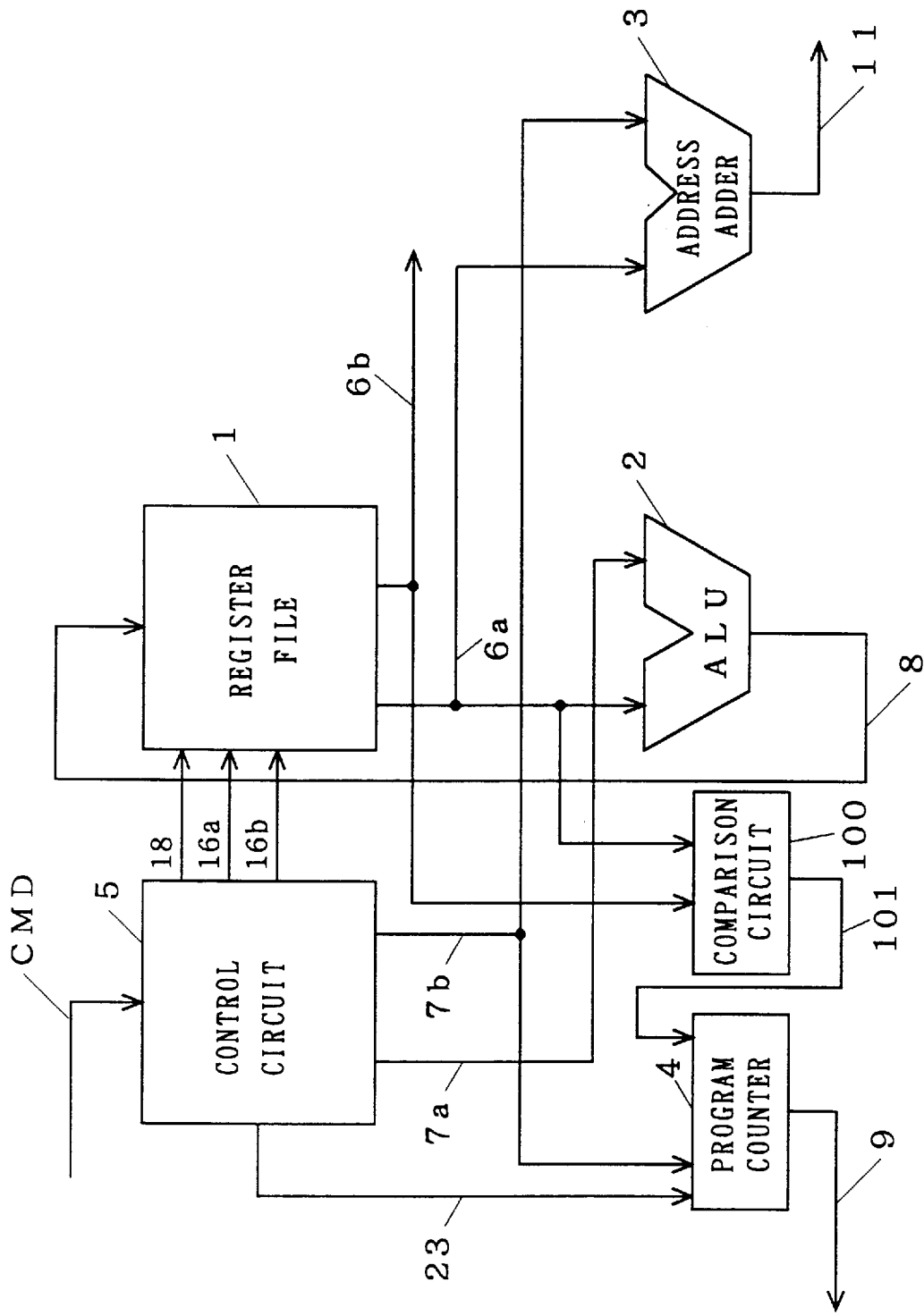
FIG. 19 is a block diagram showing a structure of a conventional computer.

On the other hand, when the special command signal 12 is L, the transistors Q11 and Q12 are turned on, and the transistors Q21 and Q22 are turned off, and the read register selection line 20a and read selection line L2a are connected electrically, and the read register selection line 20b and read selection line L2b are electrically connected, and therefore it is same as the constitution equivalent to the conventional register file shown in FIG. 15, and the read register selection lines 20a and 20b are selectively set to H on the basis of the read register address signals 16a and 16b, same as in the prior art. The internal structure of the memory cell MC is same as the conventional structure shown in FIG. 16.

<Operation>

The execution of the "push" command by the computer of the first preferred embodiment shown in FIG. 2 is described below.

When the command CMD is "push" command, the control circuit 50 decodes the command CMD in a first cycle, sets the immediate value −6 in the control data 7a and sets the immediate value −1 in the control data 7b on the basis of the decoding result. At the same time, the special command signal 12 is set to H.

The register file 30, receiving the special command signal 12 of H, outputs the stored data value (D20) of register $29 to the ALU 2 and address adder 3 as register data 6a, regardless of the values of read register address signals 16a and 16b, and outputs the stored data value (D31) of register $31 to the external memory as register data 6b.

The control circuit 50, in a second cycle executed successively to the first cycle, outputs the write register address signal 18 for specifying the register $29 as write register. At this time, the ALU 2 outputs the result of addition of register data 6a (D29) and control data 7a (−6) to the register file 30 as ALU operation result 8. As a result, as the stored data value of register $29 in the register file 30, the ALU operation result 8 (D29−1) is written in.

Parallel to the operation of the ALU 2, the address adder 11 outputs the result of addition of register data 6a (D29) and control data 7b (−1) to the external memory as address addition result 11. As a result, the register data 6b (D31) is written in the address of the address addition result 11 (D29−1) of the external memory.

In this way, in the computer of the first preferred embodiment, by constituting so that the processing conventionally executed by two commands can be executed by one "push" command without causing any adverse effect, the number of commands to be executed is decreased and high performance processing is realized. Besides, by the decrease of the number of commands, the actually required memory capacity is smaller, while the same processing is possible, and it leads to elevation of the hit rate of the cache memory which is indispensable in a recent computer. As the hit rate is better, the number of execution commands is decreased, and the computer of high performance is realized, and it is also expected that the performance as the system may be further enhanced.

In addition, when the command CMD is "push" command, the control circuit 50 sets the special command signal 12 to H, and outputs the stored data of registers $29 and $31 at high speed from the register file 30 as register data 6a and 6b, so that the "push" command can be executed at high speed.

Moreover, by means of the ALU 2 and address adder 3, respectively, the ALU operation result 8 and address addition result 11 can be determined simultaneously, so that the "push" command can be executed at higher speed.

Still more, writing process of the ALU operation result 8 into register $29 of the register file 30 and writing process of the address addition result 11 into the external memory can be done simultaneously, so that the "push" command may be executed further at higher speed.

<Others>

In the first preferred embodiment, when the control circuit 50 receives "push" command, the special command signal 12 of H is outputted, so that the stored data of registers $29 and $31 are outputted by force from the register file 30, but it may be also constituted as follows: when the control circuit 50 receives the "push" command, the read register address signals 16a and 16b instructing the reading from the registers $29 and $31 are outputted, and the stored data of the registers $29 and $31 are outputted from the register file 30.

Such constitution is advantageous in that the special command signal 12 is not needed, but is inferior in that the execution speed is poor because the read and write actions of ordinary registers are executed.

<<Second Preferred Embodiment>>

<Principle>

In a conventional computer, as shown in FIG. 18, repetitive processing such as a "for" statement is executed. An addition command such as "addi" of command 4 or a comparison command such as "bne" of command 5 in FIG. 18 is a process that takes a very long time, and the process of adding by one command and comparing later was not simultaneously and comprehensively done by the computer.

However, a computer having a new circuit capable of executing such process of adding and then comparing in batch is described in "Evaluation of A+B=K Conditions Without Carry Propagation," JCS, Vol. 41, No. 11, pp. 1484. According to the method of this paper, the process of adding and comparing can be executed together at high speed (at an equivalent speed of an ordinary comparative circuit). Therefore, these two commands can be executed as one command. That is, the number of commands to be executed decreases, so that a computer of high performance can be obtained.

Here arises a problem. For example, when such combined command is created as "addibne" command in the machine language according to the method of the R3000, it becomes as shown in FIG. 4. In FIG. 4, command 4 is "addibne" command. The first six bits form a command code expressing "addibne" command, the next five bits represent register $28 to be read out for adding, the next five bits denote register $30 holding the data to be compared, the subsequent 16 bits express "1" which is the number to be added, and the final 16 bits express "−1" as the address at the branch destination.

At this time, as known from FIG. 4, the machine language of the new command is 53 bits, which is different from the other commands having only 32 bits. Such addition of a new command differing in the number of bits from the other commands is extremely impractical.

If daring to use, the size of the number to be added must be limited smaller than the original 16 bits, or the number to be added for determining the branch destination must be limited smaller than the original 16 bits. As a result, the command initially processed by the computer may not be processed. The size of the number to be added may be a small value as mentioned later, but if the number to be added is limited to 1 bit, the total number of bits of addibne command exceeds 32 bits.

To solve this problem, it may be considered to decrease the elements specified in the command. By tacitly determining the register to be used in this addibne command, the number of elements that must be specified in the addibne can be decreased, and the command is limited within 32 bits, so that the above problem can be solved.

This addibne command requires an addition register to which a specific value is continuously added, and a reference register for holding the reference data for comparing the value of the register after addition, and these register numbers are determined tacitly. This is the same procedure as the stack pointer register is determined as $29 or the link register as $31. For example, the addition register for holding the times counting value is determined as $28, and the reference register for holding the reference data to be compared as $30.

This fixing of registers is limited, however, only to the addibne command, and registers $28 and $30 can be used as ordinary registers in other commands.

By thus specifying register numbers tacitly in the addibne command, the command row of "for" statement using this novel command becomes as shown in FIG. 5. In FIG. 5, command 4 shows addibne command, and the first six bits refer to the addibne command, and the next five bits and further five bits express the value 1 added to the addition register $28, and the final 16 bits express the value −1 as the address of the branch destination.

In the conventional series of commands, the value to be added can be specified up to 16 bits, but in the invention the value to be added is reduced to 10 bits at maximum. Therefore, a conventional series of commands may not be converted to a series of commands of the invention. However, the value to be added is usually added in order to count the number of times, and it is mostly considered to be 1 or =1. When counting odd numbers or even numbers on the program, the value to be added may be 2 or −2, but generally such large values are not used frequently. Therefore, considering current programs, the size to be specified in 10 bits seems to be sufficient practically.

Or, in the case of a series of commands causing a problem in the use of the new addibne command, as in the first preferred embodiment, the series of commands that cannot be converted can be executed by the conventional series of commands (nothing is changed in the function of the conventional computer in the invention), and hence the small number of bits does not matter at all. Considering the nature of the program, the number of bits is sufficient for the widely used "for" statement.

<Structure>

Figure 6:
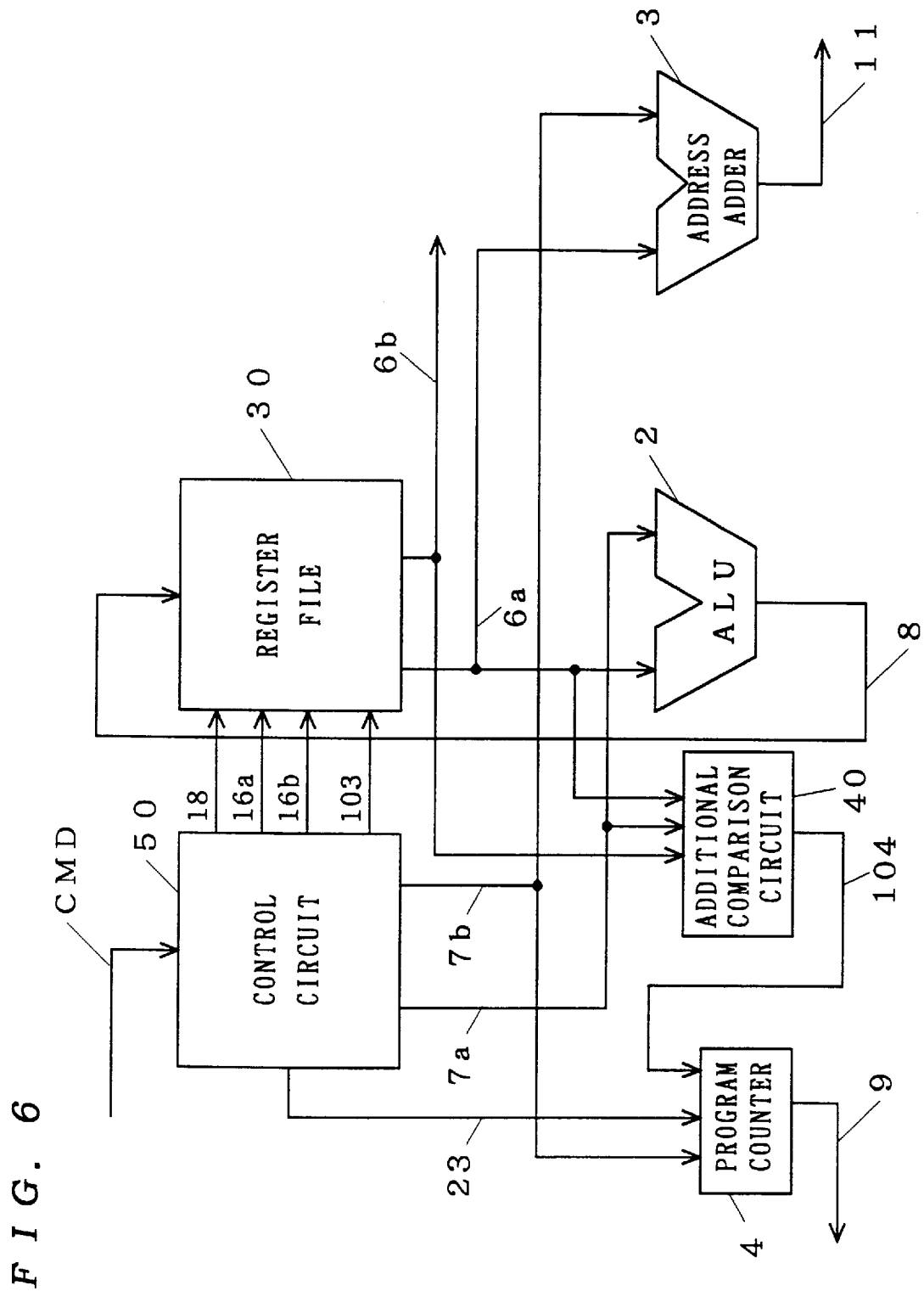
FIG. 6 is a block diagram showing the structure of a computer in the second preferred embodiment of the invention.

A hardware structure of the computer in the second preferred embodiment of the invention for processing the command in FIG. 5 is shown in FIG. 6. In FIG. 6, reference numeral 1 is a register file, 2 is an ALU, 3 is an address adder, 4 is a program counter, and 50 is a control circuit (including command decoder). Herein, shift circuits, multiplying circuits and all others relating to operation are contained in the ALU 2. Reference numerals 6a, 6b are register (stored) data being read out from a register file 30, 7a, 7b are control data being outputted from the control circuit, 8 is an operation result of ALU, 9 is a program count value outputted from the program counter 4, that is, the address value of command memory, CMD is an output signal of command memory, that is, a command for operating the computer, and 11 is an operation result of address adder, that is, an address value of data memory. Reference numeral 18 is a register address signal in which the number of the register to write in described in the command word is written, and 16a, 16b are read register address signals showing the number of the register to read described in the command word. Reference numeral 103 is a special command signal meaning addibne command, and it is a signal becoming "H" when the command CMD instructs addibne command.

The control circuit 50 receives a command CMD, and outputs the control data 7a to the ALU 2 and addition comparison circuit 40 on the basis of the command CMD, outputs the control data 7a to the address adder 3 and program counter 4, and outputs the special command signal 103, read register address signals 16a, 16b, and write register address signal 18 to the register file 30. Furthermore, the control circuit 50, on the basis of the command CMD, outputs the control signal 23 for indicating the validity or invalidity of the comparison result signal 104 by H or L to the program counter 4.

The register file 30 outputs the register data 6a to the ALU 2, address adder 3, and addition comparison circuit 40 according to the special command signal 103, read register address signals 16a, 16b, and write register address signal 18, and outputs the register data 6b to the addition comparison circuit 40 and external memory not shown. If write register is indicated by the write register address signal 18, the ALU operation result 8 is written into the write register.

Moreover, when the special command signal 103 is H, the register file 30 outputs the stored data value of register $28 as register data 6a, and the stored data value of register $30 as register data 6b, regardless of the values of read register address signals 16a and 16b.

The ALU 2 adds the register data 6a and control data 7a, and outputs the addition result, ALU operation result 8, to the register file 30.

The address adder 3 adds the register data 6a and control data 7b, and outputs the addition result, the address addition result 11, to the external memory. This address addition result 11 is the address to be accessed by the external memory.

The addition comparison circuit 40 compares the sum of the register data 6a and control data 7a with the register data 6b, and outputs the result of comparison as the comparison result signal 104 to the program counter 4.

The program counter 4 receives the control signal 23, control data 7b and comparison result signal 104, and outputs the value adding control data 7b to the present program count value 9 as a new program count value 9 when the control signal 23 is H and the comparison result signal 104 indicates disagreement, and adds 1 to the program count value 9 to output as a new program count value 9 when the control signal 23 is H and the comparison result signal 104 shows agreement. When the control signal 23 is L, the program counter 4 always adds 1 to the present program count value 9, and outputs as a new program count value 9.

In FIG. 6, functions necessary for processing of the ordinary computer and connections of individual blocks are omitted. Of course, the computer of the invention can also execute the processing of the ordinary computer.

<Register File>

Figure 7:
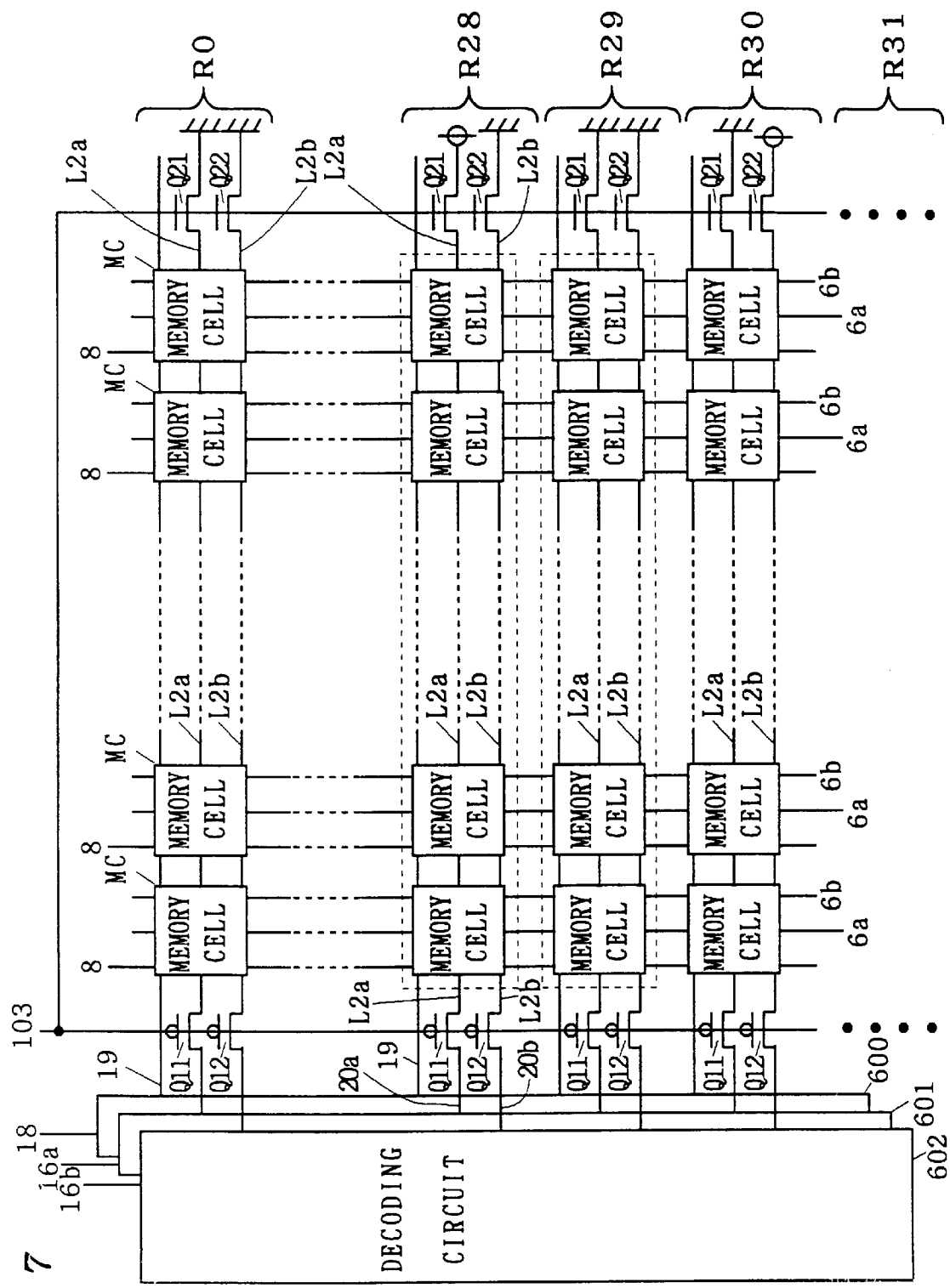
FIG. 7 is an explanatory diagram showing an internal structure of a register file in FIG. 6.

FIG. 7 is an explanatory diagram showing an internal structure of the register file 30 of the second preferred embodiment. As shown in the diagram, same as the register file in the first preferred embodiment shown in FIG. 3, memory cells MC are formed in a matrix, and the memory cells MC of each line are respectively registers R0 to R31 of $0 to $31. Access to these memory cells MC is effected under control of decoding circuits 600 to 602. Hereinafter, mainly different points from the register file 30 in the first preferred embodiment are described.

A PMOS transistor Q11 is inserted between each read register selection line 20a and reach read selection line L2a of registers R0 to R31, and a PMOS transistor Q12 is inserted between each read register selection line 20b and each read selection line L2b of registers R0 to R31. A special command signal 103 is applied to the gates of the transistors Q11 and 12.

Each read selection line L2a of registers R0 to R27, R29 to R31 is grounded through an NMOS transistor Q21, and only the read selection line L2a of the register R28 is connected to a power source VDD through the NMOS transistor Q21. Each read selection line L2b of registers R0 to R29, R31 is grounded through an NMOS transistor Q22, and only the read selection line L2b of register R30 is connected to the power source VDD through the NMOS transistor Q22. The special command signal 103 is commonly applied to the gates of the transistors Q21 and 22.

Therefore, when the special command signal 103 is H, the transistors Q11 and Q12 are turned off, and the transistors Q21 and Q22 are turned on, and all of read register address signals 16a and 16b are released from the control of the decoding circuits 601 and 602, and are set to H or L by force. That is, the read selection lines L2a of registers R0 to R27, R29 to R31 are set to L, the read selection line L2a of register R28 is set to H, the read selection lines L2b of registers R0 to R29 and R31 are set to L, and the read selection line L2b of register R30 is set to H.

On the other hand, when the special command signal 103 is L, the transistors Q11 and Q12 are turned on and the transistors Q21 and Q22 are turned off, and therefore the read register selection line 20a and read selection line L2a are electrically connected, and the read register selection line 20b and read selection line L2b are electrically connected, so as to be equivalent to the conventional register file shown in FIG. 15, and therefore same as in the prior art, on the basis of the read register address signals 16a and 16b, the read register selection lines 20a and 20b are selectively set to H, and the read register is selectively operated. Meanwhile, the internal structure of the memory cell MC is same as in the conventional constitution shown in FIG. 16.

<Operation>

Explained below is the execution of the addibne command by the computer of the second preferred embodiment shown in FIG. 6.

When the command CMD is addibne command, in a first cycle, the control circuit 50 decodes the command CMD, and sets the immediate value 1 to be added to the register counter 6a as the control data 7a on the basis of the decoding result, and sets the immediate value −2 to be added to the program count value 9 as control data 7b, and sets the control signal 23 and special command signal 103 to H.

The register file 30, according to the special command signal 103 of H, outputs the stored data value (D28) of register $28 as the register data 6a, and outputs the stored data value (D30) of register $30 as register data 6b. The addition comparison circuit 40 compares the value of adding the control data 7a (1) to the register data 6b (D30) with the register data 6b (D30), and outputs the result of comparison to the program counter 4 as comparison result signal 104. At the same time, the ALU 2 outputs the sum of the register data 6a (D28) and control data 7a (1) as the ALU operation result 8.

In a second cycle executed in succession to the first cycle, the control circuit 50 outputs write register address signal 18 for specifying the register $28 as write register. As a result, the ALU operation result 8 (D28+1) is written as the stored data value of the register $28 in the register file 30.

At the same time, the program counter 4 receiving the control signal 23 of H outputs a value (3) adding control data 7b (−2) to the present program count value 9 (5) as a new program count value 9 when the comparison result signal 104 shows disagreement, and adds 1 to the present program count value 9 (5) and outputs as a new program count value 9 (6) when the comparison result signal 104 shows agreement.

In this way, the computer of the second preferred embodiment is constituted so as to execute the process which was conventionally executed by two commands by one command "addibne" only without giving adverse effects to others, so that high performance processing is realized by decreasing the number of commands to be executed. By the decreased number of commands, the same processing is possible by a smaller memory capacity, and it leads to elevation of the hit rate of the cache memory that is indispensable in the recent computers. By the improvement of the h it rate, the number of execution commands is decreased, and a computer of high performance is realized, and it is also expected to further enhance the performance as the system.

In addition, the control circuit 50 sets the special command signal 103 to H when the command CMD is addibne command, and therefore outputs the stored data of registers $28 and $30 at high speed from the register file 30 as register data 6a and 6b, so that the addibne command can be executed at high speed.

<Modified Example of Addibne Command>

<First Modified Example>

The addibne command shown in FIG. 5 uses 10-bit information, and in the command system, the register ($28) for adding the stored data and the register ($30) for storing the reference data to be compared are fixed, and the value to be added is expressed by 10 bits, but if the value to be added is not required to be as much as 10 bits, the value to be added may be formed in five bits, and the register number may be specified by the remaining five bits. When the addition register for adding the stored data is specified by five bits for specifying the register number, it is not necessary to fix the addition register in register $28, and the selection range of the addition register is extended, so that the compiler can create the series of commands more freely.

<Second Modified Example>

Moreover, two registers may be specified by five bits for specifying the register number mentioned above. In the ordinary method of specifying the number of the register file, only one register can be specified by five bits, but in the addibne command, the command rule may be defined so that it is tacitly determined that the upper three bits of the number of the register being used are fixed. For example, in the case of the register to which the stored data necessary in addibne command is added, the upper three bits are fixed at 110, and one of the registers $24, $25, $26, $27 is specified in two bits, or in the case of the register for storing the reference data, one of the registers $28, $29, $30, $31 of which upper three bits are fixed in 111 are specified by two bits. That is, the addition register group is composed of registers $24 to $27, and the reference register group is composed of registers $28 to $31.

Incidentally, the "for" statement may be used in duplicate. A duplicate example of "for" statement is shown in FIG. 8. This is an example of program of repeating command 7 by 1025 times from command 5, and repeating command 10 by 1024 times from command 3. In this case, there are two registers ($2 and $4) to be added, and two registers ($1 and $3) in which data to be compared is stored, and therefore the addibne command of the third preferred embodiment of the invention cannot be used.

In the second modified example, however, up to four ($24 to $27) addition registers can be specified from the addition register group, and up to four ($28 to $31) reference registers can be specified from the reference register group, so that the addibne command can be used without problem up to four "for" statements.

FIG. 9 is an example of description of double loop of FIG. 8 by using the addibne command of the second modified example. In this addibne command, as mentioned above, in the case of addition register, the upper three bits are fixed at 110, and in the case of reference register for storing the reference data, upper three bits are specified at 111. Then, corresponding to 00, 01, 10, 11 of lower two bits (bit 0, bit 1) out of five bits ( indicated as %X) for specifying the register number, registers $24 to $27 are individually specified, and corresponding to 00, 01, 10, 11 of the second and third bits of %X, registers $28 to $31 are specified individually.

Therefore, as the register to be added by %0 (00000) of addibne command of command 6, $24 is specified, while $28 is specified as register for reference. Besides, as the register to be added by %5 (00101) of addibne command of command 8, $25 is specified, while $29 is specified as register for reference.

In this way, by describing the double loop in FIG. 8 newly as shown in FIG. 9 by using the addibne command in the second modified example of the second preferred embodiment, processing can be done by omitting 1024× 1025=1049600 times of commands, so that a computer of a very fast speed can be realized.

<Others>

In the second preferred embodiment, when the control circuit 50 receives addibne command, it outputs special command signal 103 of H, and thereby the stored data in registers $28 and $39 are outputted by force from the register file 30, but it may be also constituted as follows: when the control circuit 50 receives addibne command, read register address signals 16a and 16b instructing the reading from the registers $28 and $30 are outputted, so that the stored data of registers $28 and $30 are outputted from the register file 30.

By thus constituting, it is advantageous in that the special command signal 103 is not needed, but is inferior in that the execution speed is poor because the read action of ordinary register is executed.

<<Third Preferred Embodiment>>

<Structure>

Figure 10:
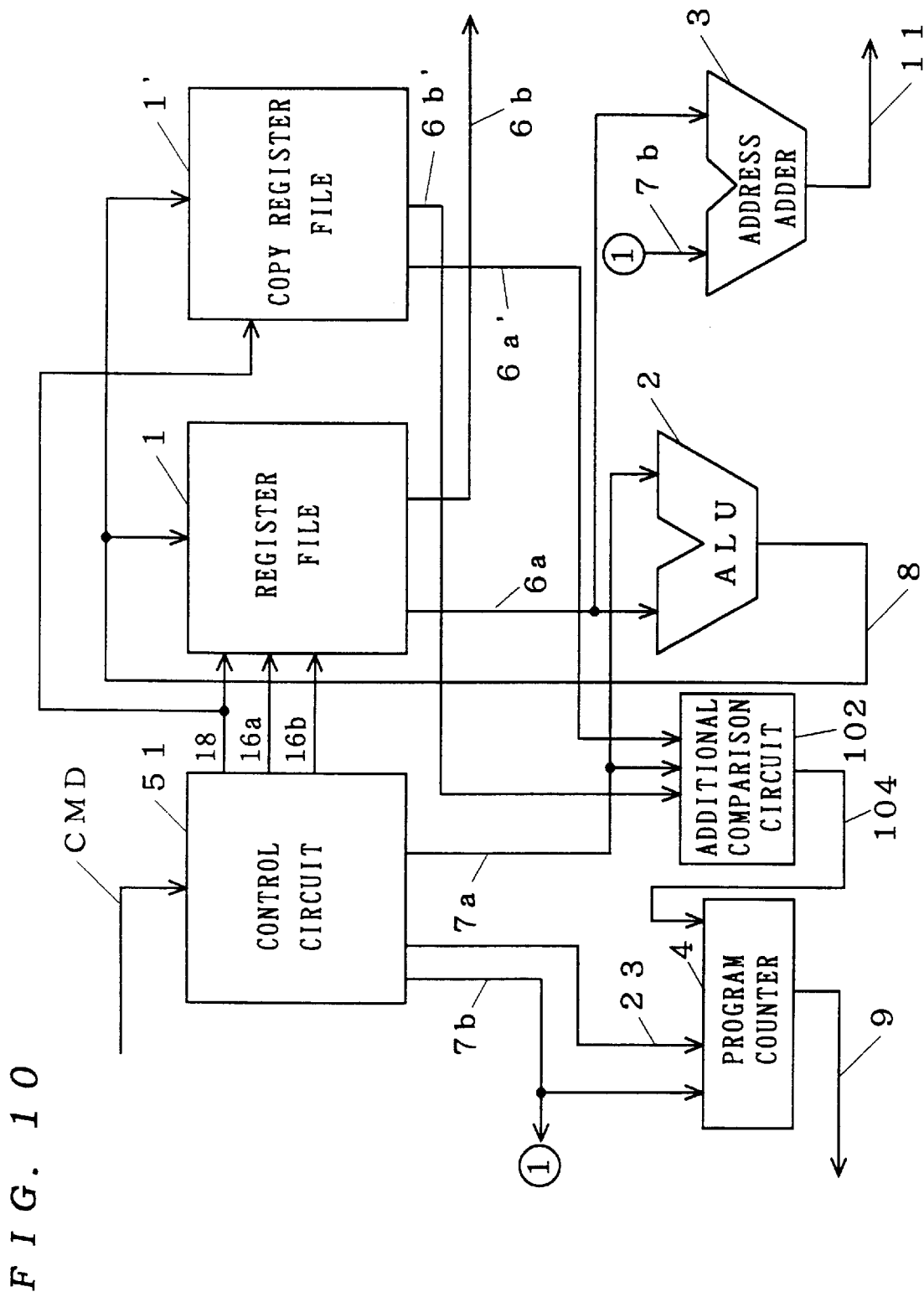
FIG. 10 is a block diagram showing the structure of a computer in a third preferred embodiment of the invention.

FIG. 10 is a block diagram showing the structure of a computer in a third preferred embodiment of the invention. As shown in FIG. 10, a control circuit 51 receives command CMD, and outputs control data 7a to an ALU2 and addition comparison circuit 40 according to the command CMD, outputs control data 7b to an address adder 3 and program counter 4, outputs read register address signals 16a, 16b, and write register address signal 18 to a register file 1, outputs write register address signal 18 to a copy register file 1', and outputs control signal 23 for instructing validity or invalidity of comparison result signal 104 by H or L to the program counter 4.

The internal structure of the register file 1 is exactly same as the conventional structure shown in FIG. 15, and according to the read register address signals 16a, 16b and write register address signal 18, the register data 6a is outputted to the ALU 2 and address adder 3, and the register data 6b is outputted to an external memory not shown. If write register is instructed by write register address signal 18, the ALU operation result 8 is written into the write register.

The copy register file 1' outputs coy register data 6a' and 6b' always to the addition comparison circuit 40. The copy register data 6a' is stored data of copy register R28' of $28 storing the same data as the stored data of register R28 (addition register) of $28 in the register file 1, and the copy register data 6b' is stored data of copy register R30' of $30 storing the same data as the stored data of register R30 (reference register) of $30 in the register file 1.

Figure 11:
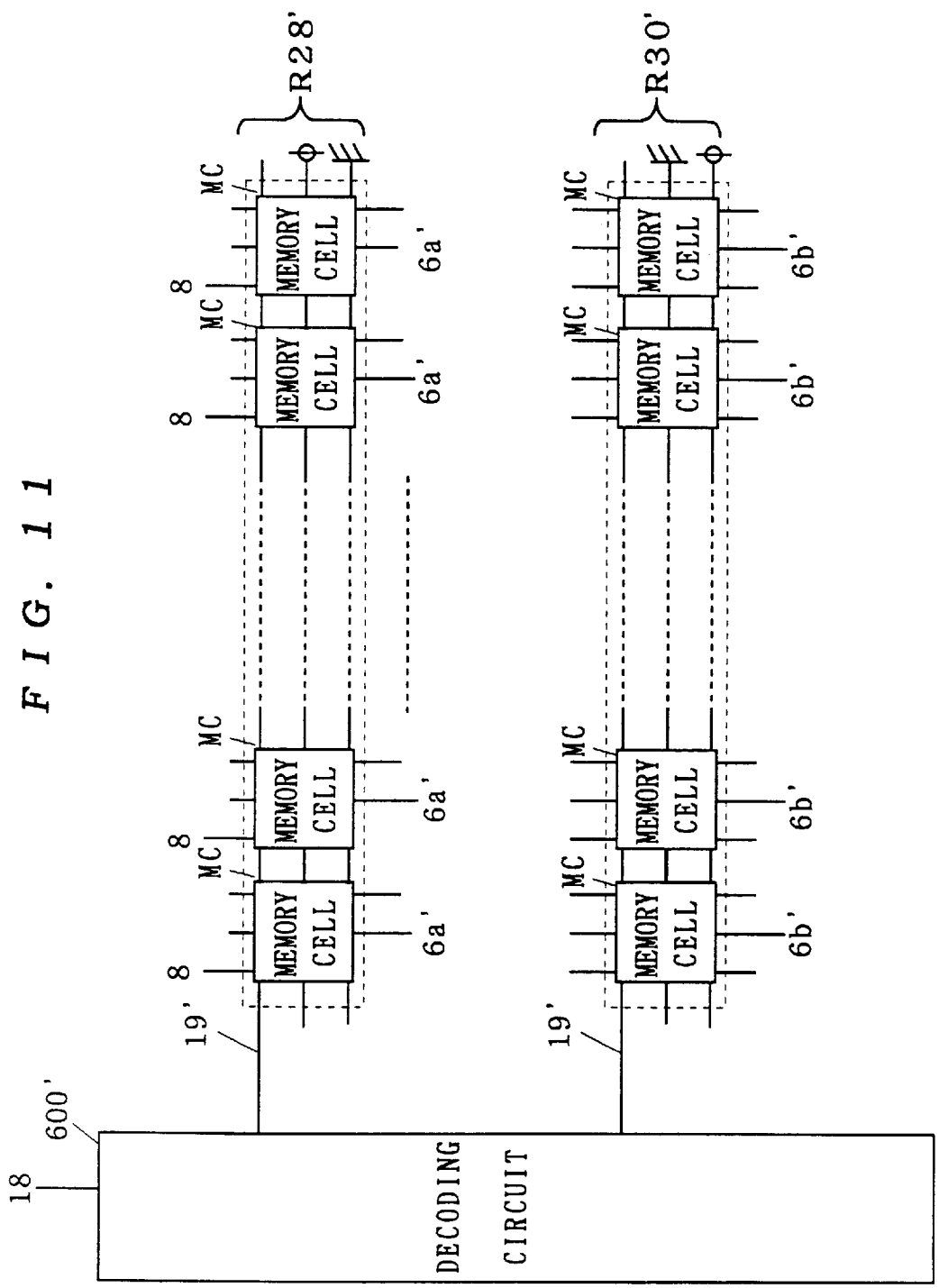
FIG. 11 is an explanatory diagram showing an internal structure of a copy register file in FIG. 10.

FIG. 11 is an explanatory diagram showing the internal structure of the copy register file 1' of the third preferred embodiment. As shown in diagram, memory cells MC are composed in two lines in a matrix, and the memory cells MC of the first line form the copy register R28' of $28, and the memory cells MC of the second line form the copy register R30 of $30, and the access when writing into the memory cells MC is effected under the control of a decoding circuit 600'.

Figure 12:
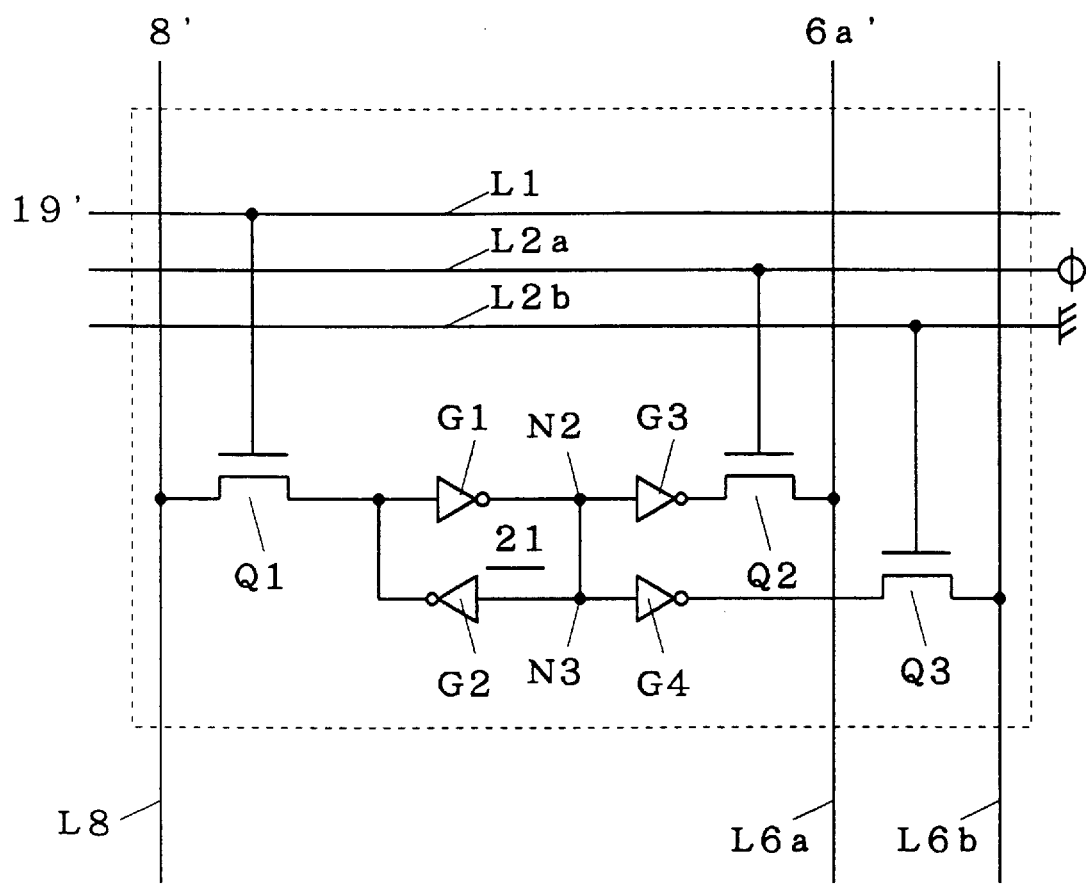
FIG. 12 is a circuit diagram showing an internal structure of a memory cell in FIG. 11.
Figure 13:
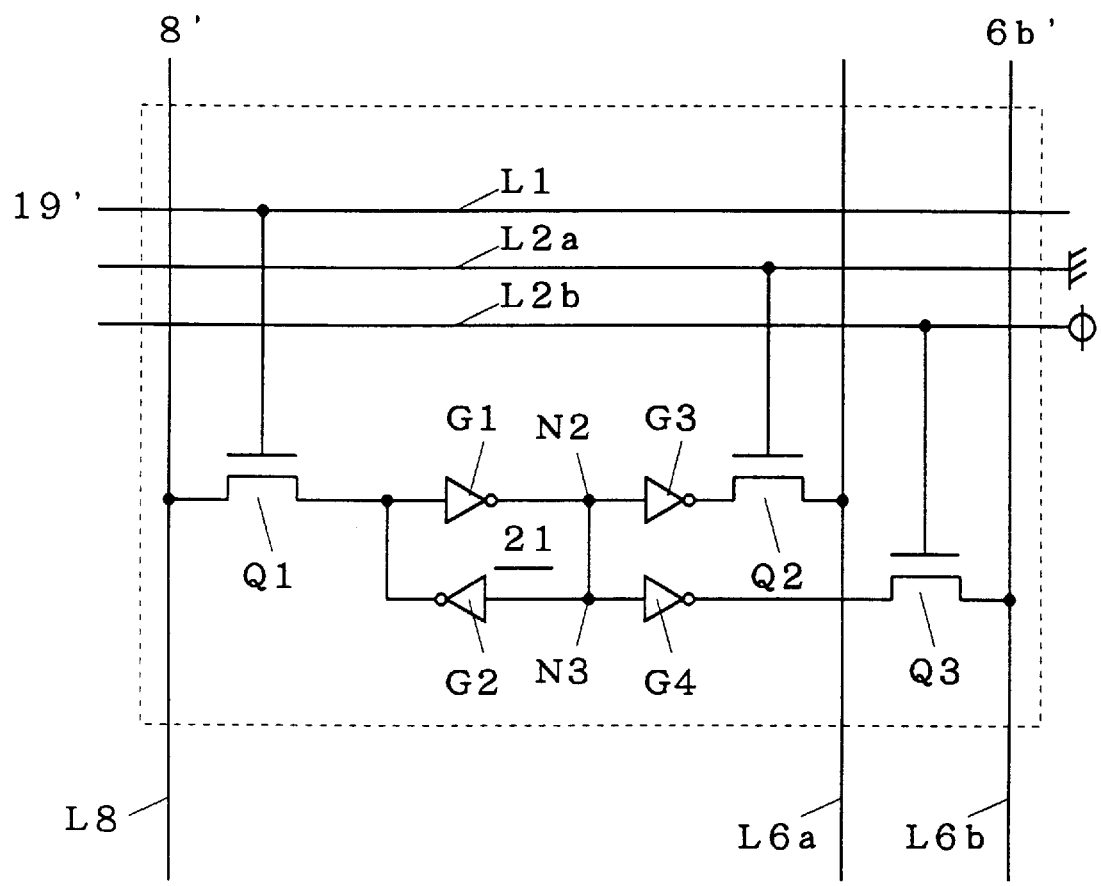
FIG. 13 is a circuit diagram showing an internal structure of a memory cell in FIG. 11.
Figure 14:
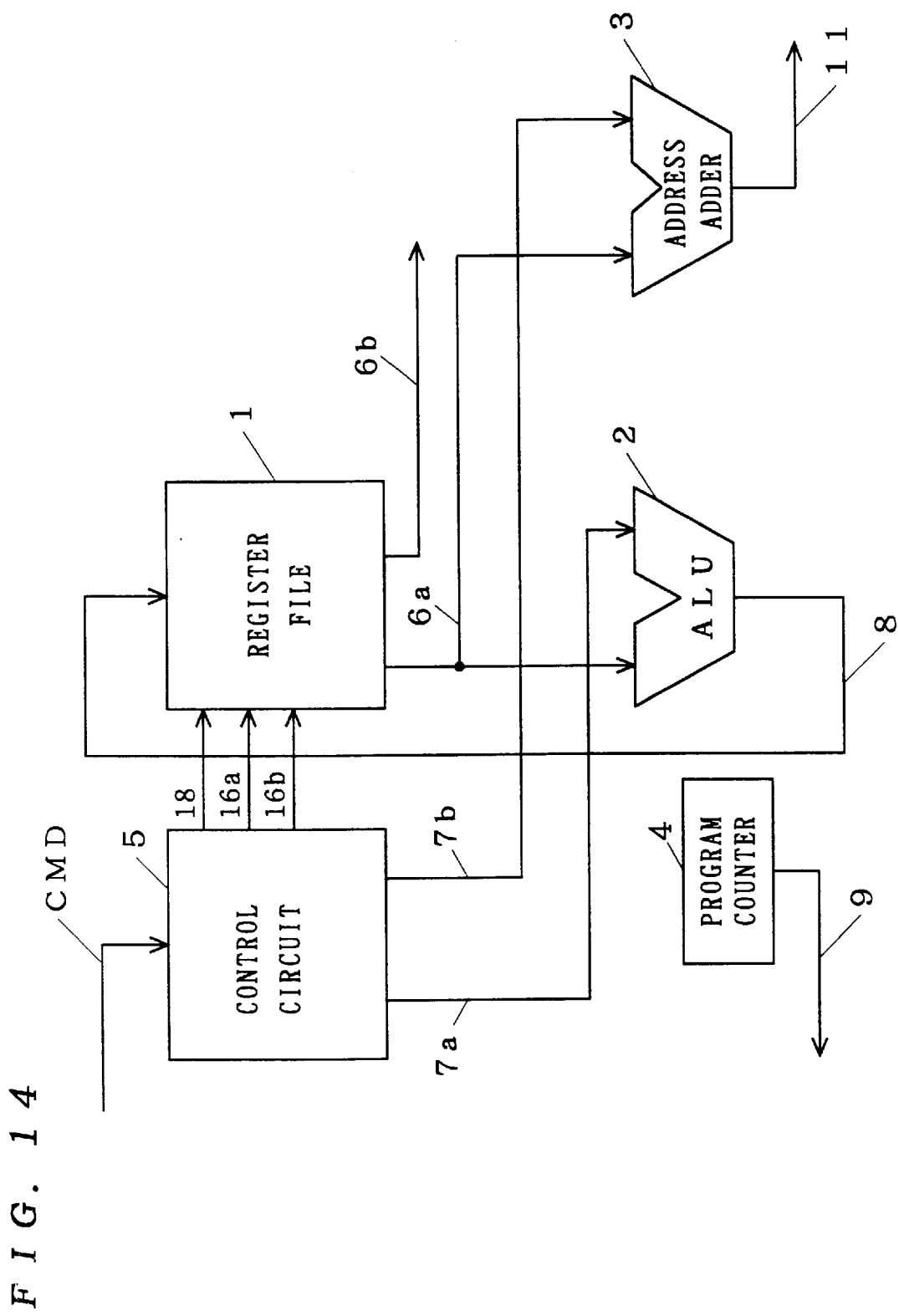
FIG. 14 is a block diagram showing a structure of a conventional computer.

The decoding circuit 600' receives write register address signal 18, and selectively sets the two write register selection lines 19' to H on the basis of the write register address signal 18. In each memory cell MC of the register R28', as shown in FIG. 11 and FIG. 12, the read selection line L2a is connected to the power source VDD, and the read selection line L2b is grounded. In each memory cell MC of the register R30', as shown in FIG. 11 and FIG. 13, the read selection line L2a is grounded, and the read selection line L2b is connected to the power source VDD. The other parts of the internal structure of the memory cell MC are same as the constitution of the conventional memory cell MC shown in FIG. 16, and duplicate explanations are omitted herein.

Back to FIG. 10, the ALU 2 adds the register data 6a and control data 7a, and outputs the addition result, the ALU operation result 8, to the register file 1.

The address adder 3 adds the register data 6a and control data 7b, and outputs the addition result, the address addition result 11, to the external memory. This address addition result 11 is the address to be accessed by the external memory.

The addition comparison circuit 40 compares the value adding control data 7a to the copy register data 6a' with the copy register data 6b', and outputs the comparison result to the program counter 4 as comparison result signal 104.

The program counter 4 receives the control signal 23, control data 7b, and comparison result signal 104, and outputs the value adding the control data 7b to the present program count value 99 as a new program count value 9 when the control signal 23 is H and the comparison result signal 104 shows disagreement, and adds 1 to the program count value 9 and outputs as a new program count value 9 when the control signal 23 is H and the comparison result signal 104 shows agreement. Besides, when the control signal 23 is L, the program counter 4 always adds 1 to the present program count value 9 and outputs as a new program count value 9.

In FIG. 10, functions necessary for processing of ordinary computer and connections of blocks are omitted. Of course, the computer of the invention can execute the processing of an ordinary computer.

<Operation>

Described below is the execution of the addibne command shown in FIG. 5 by the computer of the third preferred embodiment shown in FIG. 10.

The addition comparison circuit 40 compares the value adding the control data 7a (1) to the copy register data 6a' (D28) with the copy register data 6b' (D30), and outputs the comparison result always to the program counter 4 as the comparison result signal 104.

When the command CMD is addibne command, the control circuit 51, in a first cycle, decodes the command CMD, and, according to the result of decoding, sets the immediate value 1 added to the register data 6a as control data 7a, sets the immediate value −2 added to the program count value 9 as control data 7b, sets the control signal 23 to H, and sets the read register address signal 16a so as to specify the register $28 as the read register.

Consequently, the register file 1 outputs the stored data value (D28) of the register $28 as the register data 6a according to the read register address signal 16a. The ALU 2 outputs the value adding the control data 7a (1) to the register data 6a (D28) as the ALU operation result 8.

The program counter 4 receiving the control signal 23 of H outputs the value (3) adding the control data 7b (−2) to the present program count value (5) as a new program count value 9 when the comparison result signal 104 shows disagreement, and adds 1 to the present program count value 9 (5) and outputs as a new program count value 9 (6) when the comparison result signal 104 shows agreement.

In a second cycle executed in succession to the first cycle, the control circuit 51 outputs the write register address signal 18 for specifying the register $28 as the write register. As a result, the ALU operation result 8 (D28+1) is written as the stored data of the register $28 in the register file 1 and the stored data of copy register of $28 in the copy register file 1'.

In this way, the computer of the third preferred embodiment is constituted so as to execute the process which was conventionally executed by two commands by one addibne command only without giving adverse effects to others, so that high performance processing is realized by decreasing the number of commands to be executed.

Moreover, by adding the copy register file 1', the register file 1 of the conventional constitution can be directly used. Therefore, by the addibne command handling, delay of processing of the register file 1 does not occur.

In addition, as the copy register data 6a' and 6b' of the copy register file 1', the same data as the stored data of the registers $28 and $30 in the register file 1 are always outputted, and the comparison result signal 104 of the addition comparison signal 40 can be obtained early, so that the group branching judgement may be done at higher speed than in the second preferred embodiment.

While the invention has been shown and described in detail, the foregoing description is in all aspects illustrative and not restrictive. It is therefore understood that numerous modifications and variations can be devised without departing from the scope of the invention.

I claim:

1. A computer comprising:
   a data read section including plural registers for receiving a command obtained from outside, and outputting stored data of said plural registers selectively as read data based on said command, said command containing a special command implicitly referencing registers for reading out stored data; and
   a data operation section for operating according to said read data to output an operation result;
   wherein said data read section specifies two registers out of said plural registers as first and second specific registers when said command is said special command, and for outputting first stored data which is stored data of said first specific register and second stored data which is stored data of said second specific register as said read data.

2. The computer of claim 1, wherein said data read section comprises:
   control means for outputting a read address signal based on said command, and asserting a special command signal when said command is said special command; and
   a register group including said plural registers, for receiving said read address signal, and outputting stored data of said plural registers selectively as said read data based on said read address signal, wherein said register group further receives said special command signal, and outputs said first and second stored data of said first and second specific registers as said read data regardless of said read address signal when said special command is asserted.

3. The computer of claim 1,
   wherein said special command is specified by a type of command, a first number, and a second number;
   said data read section further outputs said first number and second number as said read data when said command is said special command;
   said data operation section comprising:
      first operation means for operating according to said first stored data and said first number to output a first operation result; and
      second operation means for operating according to said second stored data and said second number to output a second operation result.

4. The computer of claim 3,
   wherein said data read section writes said first operation result into said first specific register when said command is said special command; and
   wherein said second operation result is specified as a write address of an external memory, and said second stored data is specified as write data to be written into said write address of said external memory.

5. A computer comprising:
   a data read section including plural registers for outputting stored data of said plural registers selectively as read data based on a command obtained from outside, said command containing a special command implicitly referencing a reference register for reading out stored data; and
   a data operation unit for operating according to said read data and outputting an operation result;
   wherein said data read section specifies said reference register out of said plural registers when said command is said special command, and for outputting reference stored data which is stored data in said reference register as said read data; and
   wherein said data operation section comprises data comparative means for comparing said reference stored data with comparative data to output a comparative result signal.

6. A computer comprising:
   a data read section including plural registers for outputting stored data of said plural registers selectively as read data based on a command obtained from outside; and
   a data operation unit for operating according to said read data and outputting an operation result;
   wherein said data read section specifies a reference register out of said plural registers when said command is a special command, and for outputting reference stored data which is stored data in said reference register as said read data; and
   wherein said data operation section comprises data comparative means for comparing said reference stored data with comparative data to output a comparative result signal,
   wherein said data read section comprises:

control means for outputting a read address signal based on said command, and asserting a special command signal when said command is a special command; and a register group including said plural registers, for receiving said read address signal, and outputting stored data of said plural registers selectively as said read data based on said read address signal, wherein said register group further receives said special command signal, and outputs said reference stored data of said reference register as said read data regardless of said read address signal when said special command signal is asserted.

7. The computer of claim 6, wherein said data read section further asserts a control signal only when said command is said special command, said computer further comprising:

a program counter for receiving said control signal and said comparative result signal, and outputting a program count value for specifying an address of the command presently being executed, based on said comparative result signal, when said control signal is asserted.

8. The computer of claim 5, wherein said special command further implicitly references an addition register;

wherein said controller further specifies said addition register other than said reference register, and selected from said plural registers, when said command is said special command, and further outputs addition stored data which is stored data in said addition register as said read data; and wherein said comparative data is generated based on said addition stored data.

9. The computer of claim 8, wherein said data read section comprises:

control means for outputting a read address signal based on said command, and asserting a special command signal when said command is a special command; and a register group including said plural registers, for receiving said read address signal, and outputting stored data of said plural registers selectively as said read data based on said read address signal, wherein said register group further receives said special command signal, and outputs said reference stored data of said reference register and said addition stored data of said addition register as said read data regardless of said read address signal when said special command is asserted.

10. The computer of claim 8, wherein said special command specifies a predetermined number for additions;

said data read section further outputs for outputting said predetermined number for additions as said read data when said command is said special command; and an adder for generating said comparative data by adding said predetermined number for additions to said addition stored data.

11. The computer of claim 10, wherein said data read section comprises outputs for writing said comparative data into said addition register when said command is said special command.

12. The computer of claim 8, wherein said data read section comprises:

control means for outputting a read address signal based on said command, and also asserting said control signal when said command is said special command;

a first register group including said plural registers, for receiving said read address signal, and outputting stored data of said plural registers selectively as said read data, based on said read address signal;

a second register group having a copy reference register for storing a copy of said reference stored data in said reference register in said plural registers, and a copy addition register for storing a copy of said addition stored data of said addition register in said plural registers, for outputting stored data of said copy reference register as said reference stored data, and stored data of said copy addition register as said addition stored data at all times; and a program counter for receiving said control signal and said comparative result signal, and outputting a program count value for specifying an address of the command presently executing, based on said comparative result signal, when said control signal is asserted.

13. The computer of claim 12, wherein said special command further specifies a predetermined number for additions;

said control means further comprises outputs for outputting said predetermined number for additions when said command is said special command; and wherein said data operation section further comprising an adder for generating said comparative data by adding said predetermined number for additions to said addition stored data.

14. The computer of claim 13, wherein said control means comprises outputs for writing said comparative data into said addition register and said copy addition register, by outputting a write address signal for indicating to write said operation result into said addition register and said copy addition register to said first and second register groups, when said command is said special command.

15. The computer of claim 5, wherein said special command specifies a register out of said plural registers that is to be used as an addition register, said data read section specifies said addition register out of said plural registers, on the basis of a register specifying value, when said command is said special command, and further outputs addition stored data which is stored data in said addition register; and said comparative data is generated based on said addition stored data.

16. A computer comprising:

a data read section including plural registers for outputting stored data of said plural registers selectively as read data based on a command obtained from outside, wherein said data read section preliminarily specifies at least two registers out of said plural registers as an addition register group, and preliminarily specifies at least two registers out of said plural registers other than said addition register group as a reference register group, said command includes a special command including a first register specifying value for specifying an addition register in said addition register group, and a second register specifying value for specifying a reference register in said reference register group;

a data operation section for operating according to said read data to output an operation result;

wherein said data read section specifies said addition register in said addition register group based on said first register specifying value, when said command is said special command, specifying said reference register in said reference register group based on said second register specifying value, and outputting as said read data both addition stored data which is stored data of said addition register and reference stored data which is stored data of said reference register; and wherein said data operation section comprises data comparative means for comparing 1) comparative data generated by using said addition data, with 2) said reference stored data, to output a comparative result signal.

* * * * *